(12) United States Patent
Frick et al.

(10) Patent No.: US 8,918,447 B2
(45) Date of Patent: Dec. 23, 2014

(54) METHODS, APPARATUS, SYSTEMS AND COMPUTER READABLE MEDIUMS FOR USE IN SHARING INFORMATION BETWEEN ENTITIES

(75) Inventors: Oliver Stefan Frick, Karlsruhe (DE); Atul M. Sudhalkar, Sunnyvale, CA (US); Priti Mulchandani, Dublin (IE); Luan O'Carroll, Dublin (IE); Jochen F. Thierer, Bruchsal (DE); Theodore John Garrish, Jr., Belmont, CA (US)

(73) Assignee: SAP SE, Walldorf (DE)

( * ) Notice: Subject to any disclaimer, the term of this patent is extended or adjusted under 35 U.S.C. 154(b) by 472 days.

(21) Appl. No.: 12/965,518

(22) Filed: Dec. 10, 2010

(65) Prior Publication Data
US 2012/0150935 A1    Jun. 14, 2012

(51) Int. Cl.
G06F 15/16      (2006.01)
G06Q 10/10     (2012.01)
G06F 17/30     (2006.01)
G06F 9/44       (2006.01)

(52) U.S. Cl.
CPC .......... G06Q 10/10 (2013.01); G06F 17/30548 (2013.01); G06F 8/71 (2013.01)
USPC .......................................... 709/201; 717/170

(58) Field of Classification Search
None
See application file for complete search history.

(56) References Cited

U.S. PATENT DOCUMENTS

| | | | |
|---|---|---|---|
| 6,735,434 B2 * | 5/2004 | Criss et al. | 455/418 |
| 6,968,184 B2 * | 11/2005 | Criss et al. | 455/418 |
| 7,117,052 B2 * | 10/2006 | Lucas et al. | 700/83 |
| 7,162,690 B2 * | 1/2007 | Gupta et al. | 715/202 |
| 7,171,432 B2 * | 1/2007 | Wildhagen et al. | 1/1 |
| 7,263,698 B2 * | 8/2007 | Wildhagen et al. | 717/170 |
| 7,373,594 B1 * | 5/2008 | Lopez et al. | 715/229 |
| 7,398,466 B2 * | 7/2008 | Jeon et al. | 715/229 |
| 7,412,463 B2 * | 8/2008 | Mitchell et al. | 1/1 |

(Continued)

FOREIGN PATENT DOCUMENTS

EP    1 645 998 A1    4/2006

OTHER PUBLICATIONS

Andre van der Hoek et al., "Software Release Management for Component-based Software", Jan. 1, 2003, Software Practice & Experience (2003), vol. 33, No. 33, XP001141809, ISSN: 0038-0644, DOI: 10.1002/SPE.496, (pp. 77-98, total 22 pages).

(Continued)

*Primary Examiner* — Ninos Donabed
(74) *Attorney, Agent, or Firm* — Buckley, Maschoff & Talwalkar LLC

(57) ABSTRACT

In one aspect, a method comprises: receiving, by a first processing system, information indicating that a second processing system has content that is to be provided to the first processing system; receiving, by the first processing system, content and at least one identifier from the second processing system; determining, by the first processing system and based at least in part on the at least one identifier, whether the content is another version of content previously received by the first processing system; receiving, by the first processing system, information indicating that a third processing system is to receive content from the first processing system; and transmitting, by the first processing system, the content, at least one identifier and version information to the third processing system, wherein the version information indicates whether the transmitted content is another version of content that has been previously transmitted by the first processing system to the third processing system.

31 Claims, 19 Drawing Sheets

(56) References Cited

U.S. PATENT DOCUMENTS

| | | | |
|---|---|---|---|
| 7,599,838 B2* | 10/2009 | Gong et al. | 704/258 |
| 7,729,792 B2* | 6/2010 | Lucas et al. | 700/108 |
| 7,778,968 B2* | 8/2010 | Cherry | 707/611 |
| 7,860,959 B1* | 12/2010 | Karpati et al. | 709/223 |
| 8,014,796 B2* | 9/2011 | Boudreau et al. | 455/457 |
| 8,037,190 B2* | 10/2011 | Apte et al. | 709/227 |
| 8,095,911 B2* | 1/2012 | Ronen et al. | 717/122 |
| 8,122,060 B2* | 2/2012 | Volkmer | 707/802 |
| 8,151,257 B2* | 4/2012 | Zachmann | 717/170 |
| 8,175,936 B2* | 5/2012 | Ronen et al. | 705/27.2 |
| 2001/0029178 A1* | 10/2001 | Criss et al. | 455/419 |
| 2002/0194382 A1* | 12/2002 | Kausik et al. | 709/246 |
| 2003/0069767 A1* | 4/2003 | Menninger | 705/7 |
| 2003/0233621 A1* | 12/2003 | Paolini et al. | 715/522 |
| 2004/0038675 A1* | 2/2004 | Criss et al. | 455/419 |
| 2005/0027377 A1* | 2/2005 | Lucas et al. | 700/28 |
| 2005/0097441 A1* | 5/2005 | Herbach et al. | 715/501.1 |
| 2006/0002340 A1* | 1/2006 | Criss et al. | 370/328 |
| 2006/0064686 A1* | 3/2006 | Demuth et al. | 717/175 |
| 2006/0143560 A1* | 6/2006 | Gupta et al. | 715/512 |
| 2007/0061033 A1* | 3/2007 | Lucas et al. | 700/108 |
| 2007/0229490 A1* | 10/2007 | Boudreau et al. | 345/418 |
| 2008/0098042 A1* | 4/2008 | Tian et al. | 707/201 |
| 2008/0155390 A1* | 6/2008 | Karim et al. | 715/208 |
| 2009/0172043 A1* | 7/2009 | Dullanty et al. | 707/203 |
| 2010/0223239 A1* | 9/2010 | Madsen et al. | 707/695 |
| 2010/0228373 A1* | 9/2010 | Lucas et al. | 700/108 |

OTHER PUBLICATIONS

Communication: Extended European Search Report, dated Jun. 3, 2012, for European Application No. 11009724.3-2221, 7pgs.

* cited by examiner

FIG. 19

METHODS, APPARATUS, SYSTEMS AND COMPUTER READABLE MEDIUMS FOR USE IN SHARING INFORMATION BETWEEN ENTITIES

FIELD

Some embodiments of the present invention relate to sharing information between entities.

BACKGROUND

Businesses software systems are often built using a collection of software components, sometimes referred to as content. The content is sometimes viewed as falling into two categories, i.e., data (e.g., metadata, master data, catalogues, modeled processes and configurations) and code (e.g., applications, tools, built in processes and user interfaces). Content in the form of data, e.g., master data and configuration, is often useful to configure the collection of software components to perform as desired.

Business software systems often change over time. Such change, sometimes referred to as the evolution of the business software systems, is often in the form of changes in content, e.g., changes in data and/or code.

It is generally desirable to allow changes to the content of a system while minimizing (or at least limiting) the impact of such change on the remaining content of the system.

Systems that assist in the above are sometimes referred to as life cycle management systems.

SUMMARY

From time to time, it is desirable to transfer content from one system (e.g., a system of a supplier) to one or more other systems (e.g., a system of customers of the supplier).

It would be desirable to provide a system that further assists in the above so as to improve the life cycle management process for one or more of systems.

It has been determined that the life cycle management process may be improved by providing the ability to determine whether content received by a processing system is another version (e.g., a same version or a different (e.g., newer) version) of content previously received by such processing system.

In one aspect, a method comprises: receiving, by a first processing system, information indicating that a second processing system has content that is to be provided to the first processing system; receiving, by the first processing system, content and at least one identifier from the second processing system; determining, by the first processing system and based at least in part on the at least one identifier, whether the content is another version of content previously received by the first processing system; receiving, by the first processing system, information indicating that a third processing system is to receive content from the first processing system; and transmitting, by the first processing system, the content, at least one identifier and version information to the third processing system, wherein the version information indicates whether the transmitted content is another version of content that has been previously transmitted by the first processing system to the third processing system.

In some embodiments, the received content comprises a plurality of content records, and wherein the at least one identifier comprises a plurality of identifiers, each one of the plurality of identifiers being associated with and identifying a respective one of the plurality of content records.

In some embodiments, the method further comprises determining at least one global identifier based at least in part on the at least one identifier from the second processing system and a one-to-one mapping from the at least one identifier from the second processing system to the at least one global identifier.

In some embodiments, the method further comprises: determining the at least one identifier transmitted to the third processing system based at least in part on the at least one global identifier and a one-to-one mapping between the at least one global identifier and the at least one identifier transmitted to the third processing system.

In some embodiments, the receiving content and at least one identifier comprises: extracting the content and the at least one identifier from the second processing system after receiving the information indicating that the second processing system has content to be provided to the first processing system.

In some embodiments, the transmitting the content to the third processing system comprises: deploying the content to the third processing system.

In some embodiments, the information indicating that a second processing system is to provide content to the first processing system is supplied by a graphical user interface in response to input from a user; and the information indicating that the third processing system is to receive content from the first processing system is supplied by a graphical user interface in response to input from a user.

In some embodiments, the at least one global identifier comprises a global identifier, and the determining whether the content is another version of content previously received by the first processing system comprises: determining, based at least in part on the global identifier that a version of the content has been previously received by the first processing system; and determining, based at least in part on the content, that the content is a same version or a different version of content previously received by the first processing system.

In some embodiments, the version of the content previously received comprises a plurality of records, the method further comprising: comparing the content to the version of the content previously received to identify one or more of the following changes to the content compared to the version of the content previously received: a first one of the plurality of records in the content is a same version as a first one of the plurality of records in the version of the content previously received; a second one of the plurality of records in the content is a different version from a second one of the plurality of records in the version of the content previously received; a third one of the plurality of records in the content is not another version of any of the plurality of records in the version of the content previously received; or one of the plurality of records in the version of the content previously received is omitted from the plurality of records in the content.

In some embodiments, the method of further comprises: providing a user interface to allow a user to reject one or more of the identified changes.

In some embodiments, the method further comprises: transmitting content from the first processing system to the third processing system based at least in part on the users choices.

In some embodiments, the method further comprises: determining whether the at least one identifier received from the second processing system includes a global identifier having an originating vendor identifier, an authoring source identifier and an application namespace field.

In some embodiments, the at least one global identifier includes an identifier having an originating vendor identifier, an authoring source identifier and an application namespace field.

In some embodiments, the content is only a portion of a content group that has a plurality of content records and is received from the second processing system.

In some embodiments, the method further comprises transmitting, by the first processing system, the content to a fourth processing system.

In another aspect, a computer readable storage medium has instructions stored thereon, the instructions being executable by a machine to result in a method comprising: receiving, by a first processing system, information indicating that a second processing system has content that is to be provided to the first processing system; receiving, by the first processing system, content and at least one identifier from the second processing system; determining, by the first processing system and based at least in part on the at least one identifier, whether the content is another version of content previously received by the first processing system; receiving, by the first processing system, information indicating that a third processing system is to receive content from the first processing system; and transmitting, by the first processing system, the content, at least one identifier and version information to the third processing system, wherein the version information indicates whether the transmitted content is another version of content that has been previously transmitted by the first processing system to the third processing system.

In some embodiments, the received content comprises a plurality of content records, and wherein the at least one identifier comprises a plurality of identifiers, each one of the plurality of identifiers being associated with and identifying a respective one of the plurality of content records.

In some embodiments, the method further comprises: determining at least one global identifier based at least in part on the at least one identifier from the second processing system and a one-to-one mapping from the at least one identifier from the second processing system to the at least one global identifier.

In some embodiments, the method further comprises: determining the at least one identifier transmitted to the third processing system based at least in part on the at least one global identifier and a one-to-one mapping between the at least one global identifier and the at least one identifier transmitted to the third processing system.

In some embodiments, the receiving content and at least one identifier comprises: extracting the content and the at least one identifier from the second processing system after receiving the information indicating that the second processing system has content to be provided to the first processing system.

In some embodiments, the transmitting the content to the third processing system comprises: deploying the content to the third processing system.

In another aspect, apparatus comprises: a processing system comprising a processor, the processing system to (i) receive information indicating that a second processing system has content that is to be provided to the first processing system; receive content and at least one identifier from the second processing system; determine, based at least in part on the at least one identifier, whether the content is another version of content previously received by the first processing system; receive information indicating that a third processing system is to receive content from the first processing system; and transmit the content, at least one identifier and version information to the third processing system, wherein the version information indicates whether the transmitted content is another version of content that has been previously transmitted by the first processing system to the third processing system.

In some embodiments, the received content comprises a plurality of content records, and wherein the at least one identifier comprises a plurality of identifiers, each one of the plurality of identifiers being associated with and identifying a respective one of the plurality of content records.

In some embodiments, the processing further to determine at least one global identifier based at least in part on the at least one identifier from the second processing system and a one-to-one mapping from the at least one identifier from the second processing system to the at least one global identifier.

In some embodiments, the processing system further to determine the at least one identifier transmitted to the third processing system based at least in part on the at least one global identifier and a one-to-one mapping between the at least one global identifier and the at least one identifier transmitted to the third processing system.

In some embodiments, the processing system to receive the content comprises: a processing system to extract the content and the at least one identifier from the second processing system after receiving the information indicating that the second processing system has content to be provided to the first processing system.

In some embodiments, the processing system to transmit the content comprises: a processing system to deploy the content to the third processing system.

This summary is not intended to be exhaustive and/or limiting. For example, while some aspects are described in this summary, other aspects may not be described in this summary but rather may be apparent from the description, drawings and/or claims which follow. In addition, for example, nor are the various portions of the aspects described in this summary, and/or any possible advantages described in this summary, required in every aspect.

BRIEF DESCRIPTION OF THE DRAWINGS

FIG. 19 is a representation of a view in a graphical user interface, in accordance with some embodiments.

DETAILED DESCRIPTION

Figure 1:
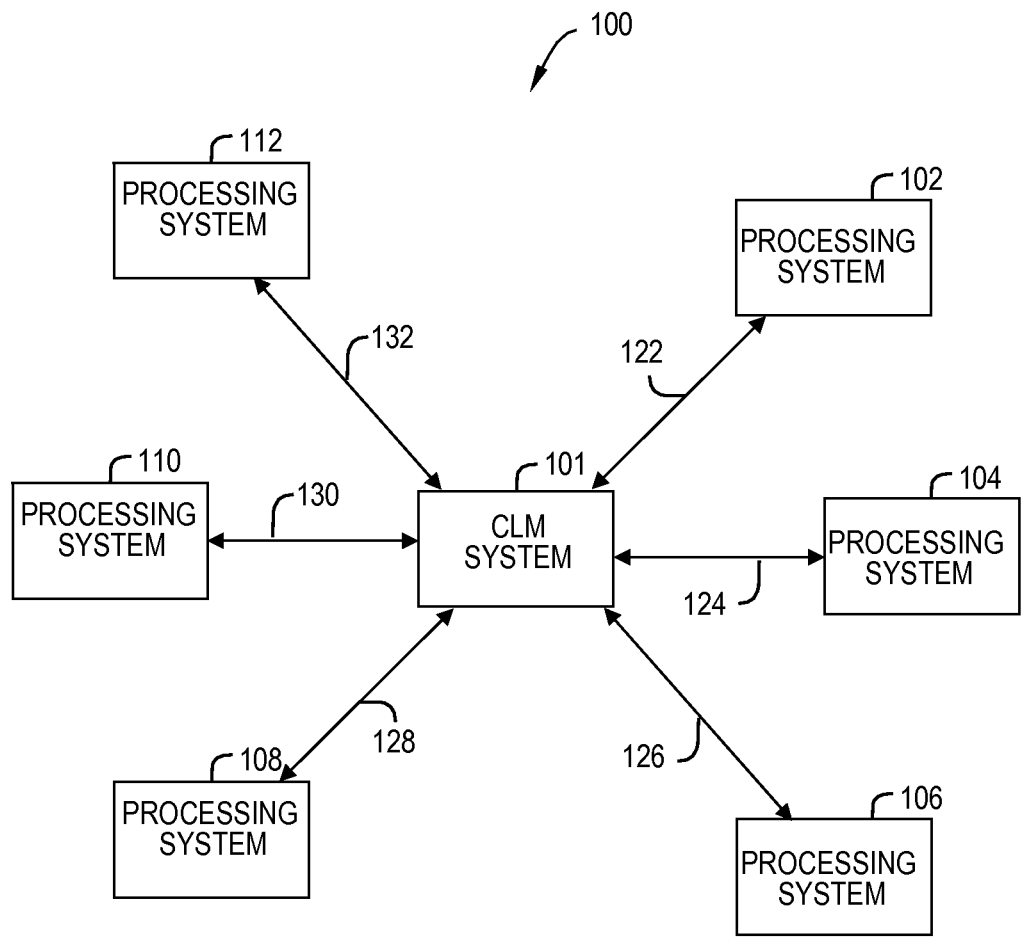
FIG. 1 is a block diagram of a system according to some embodiments.

FIG. 1 is a block diagram of a system 100, sometimes referred to herein as a landscape 100, in accordance with some embodiments.

Referring to FIG. 1, in accordance with some embodiments, the system or landscape 100 includes a plurality of processing systems 101-112. A first one of the processing systems, i.e., processing system 101, comprises a content lifecycle management (CLM) system and is sometimes referred to herein as the CLM system or CLM repository 101. A plurality of communication links 122-132 couple the other processing systems 102-112 to the CLM system 101.

Each of the processing systems 102-112 may host and/or otherwise execute (i.e., run) one or more applications.

Figure 2:
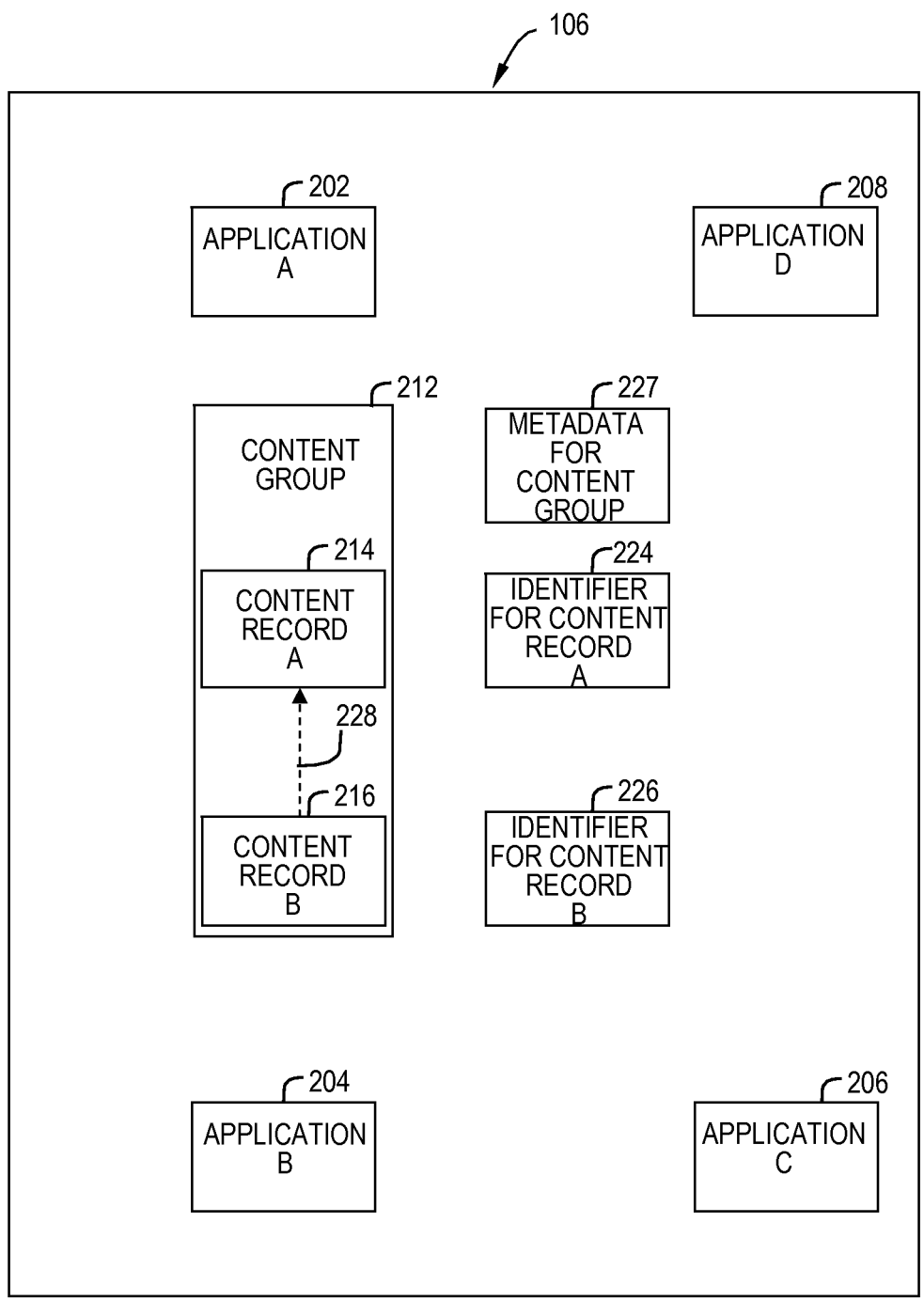
FIG. 2 is a block diagram of a portion of a processing system according to some embodiments.

For example, FIG. 2 is a block diagram of a portion of one of the processing systems, e.g., processing system 106, in accordance with some embodiments. The processing system 106 may include a plurality of applications, e.g., application A 202, application B 204, application C 206 and application D 208, which may be hosted and/or otherwise executed by the processing system 106. In some embodiments, one or more of the applications e.g., application A 202, application B 204, application C 206 and/or application D 208, comprises a program written in ABAP language. In some embodiments, one or more of the applications overlaps with one or more others of the applications.

One or more of the applications, e.g., application A 202, application B 204, application C 206 and application D 208, may include and/or otherwise provide access to content. Content may be received by the CLM system. Content received together from an application is sometimes referred to herein as a content group. For example, application A 202 may include and/or otherwise provide access to a content group 212. A content group may include one or more records, sometimes referred to herein as content records. For example, the content group 212 may include two content records, e.g., content record A 214 and content record B.

In some embodiments, one or more of the content records may include a reference to, and/or may otherwise refer to, one or more of the other content records. For example, and as represented by a dashed line 228, the content record B 216 may include a reference to, and/or may otherwise refer to, the content record A 214. If a content group includes a content record that refers to a content record not included in the content, the content group may be considered and/or treat as bad (e.g., lacking in referential integrity). Consequently, if the content group did not include content record A, the content group may be considered and/or treated as bad (lacking in referential integrity).

The one or more applications may further include and/or otherwise provide access to one or more identifiers that are associated with and/or identify the content. For example, application A may further include and/or provide access to identifiers 224-226 that are associated and/or identify the content 212. In some embodiments, each identifier is associated with and/or identifies a respective one of a plurality of the content records in a content group. For example, one of the identifiers, e.g., the identifier for content record A 224, may be associated with and/or identify content record A. The other of the identifiers, e.g., the identifier for content record B 226, may be associated with and/or identify content record B. The one or more identifiers, e.g., identifiers 224-226, may be part of the content group 212 or separate therefrom.

In some embodiments, the one or more identifiers are unique (e.g., selected so as to be unique) within the processing system in which it resides (e.g. the processing system that includes the content with which they are associated), but not necessarily unique within the system or landscape 100. For example, the identifiers 224-226 may be unique within the processing system 106, but not necessarily unique within the system or landscape 100. This may be because the processing system 106 may not be aware of and/or concerned with identifiers used within the other processing systems 102-112 of system or landscape 100. Identifiers that are not necessarily unique within the system or landscape 100 are sometimes referred to herein as local identifiers.

In some other embodiments, the one or more identifiers are unique (e.g., selected so as to be unique) within the system or landscape 100. In some of such embodiments, the one or more identifiers may comply with an identifier scheme that is used by the CLM system and further described herein, sometimes referred to herein as a CLM or global identifier scheme. Identifiers that comply with the CLM identifier scheme are sometimes referred to herein as CLM or global identifiers.

The application may further include and/or otherwise provide access to metadata regarding a content group. For example, application A may further include and/or otherwise provide access to metadata 227 regarding the content group 212.

In some embodiments, content may be shared between two or more of the applications. For example, application B 204 may also include and/or otherwise provide access to the content group 212.

In some embodiments, each of the processing systems may or may not be the same as one another. In some embodiments, each of the processing systems are independent from one another. Although the processing systems are represented as separate blocks, in some embodiments, there is no requirement that each processing system is on a separate machine. In some embodiments, two or more of the processing systems may be on the same machine. In some embodiments, the CLM system 101 is on the same machine as another one of the processing systems 102-112.

In some embodiments, there may be only one CLM system, e.g., CLM system 101, in the system 100 (or landscape 100). In some embodiments, the system 100 may include a plurality of copies of an application and each of the plurality of copies of the application may be associated with and executed on a respective one of the plurality of processing systems 102-112.

In some embodiments, one or more of the processing systems comprises an advanced business application programming (ABAP) processing system, such as for example, an SAP application server that execute one or more programs written in ABAP language.

It would be desirable to provide a system that assists in a life cycle management process for one or more of the processing systems.

For example, from time to time, it may be desirable to transfer content from one or more of the processing systems (e.g., a processing system for a supplier) to one or more of the other processing systems (e.g., a processing system for a customer).

It would be desirable to provide a system that assists in the transfer of content.

It would also be desirable to provide the ability to determine whether content received by a processing system is another version (e.g., a same version or a different (e.g., newer) version) of content previously received by such processing system.

In some embodiments, the CLM system 101 provides one or more of the above.

In some embodiments, the CLM system 101 may receive information indicating that one of the processing systems (e.g., processing system 106) has content (e.g., content group 212) that is to be provided to the CLM system 101 and made available to one or more processing systems. As further described herein, in some embodiments, the information may be supplied by a graphical user interface in response to input from a user (e.g., an administrator).

Thereafter, the CLM system 101 may receive the content (e.g., content group 212) and at least one identifier (e.g., identifiers 224, 226) from the processing system (e.g., processing system 106). The content may be received all at once or in parts. The at least one identifier may identify the content and may be received together with, or separate from, the content.

In some embodiments, the content comprises a plurality of content records (e.g., content records 214-216) and/or the at least one identifier comprises a plurality of identifiers (e.g., identifiers 224, 226). In some embodiments, each of a plurality of identifiers may be associated with and identify a respective one of a plurality of content records (e.g., identifiers 224, 226 may be associated with and identify content records 214-216, respectively). In some embodiments, the receiving of content and the at least one identifier may be performed by extracting the content and at least one identifier from the processing system (e.g., processing system 106) as further described herein.

The CLM system 101 may determine, based at least in part on the at least one identifier, whether the content is another version of content previously received by the CLM system 101. In some embodiments, the CLM system 101 may not have previously received a version of the content. In some embodiments, the content may be a same version or a different (e.g., newer) version of content previously received by the CLM system.

If the CLM system 101 determines, based at least in part on the at least one identifier, that the content is another version of content previously received by the CLM system 101, the CLM system may compare the content to the content previously received by the CLM system in order to determine whether the content is a same version of content previously received by the CLM system or whether the content is a different (e.g., newer) version of content previously received by the CLM system. If the content is a same version of content previously received by the CLM system, the CLM system may not save the content that is a same version of content previously received by the CLM system. If the content is a different version of content previously received by the CLM system, the CLM system may save the content that is a different version of content previously received by the CLM system. The CLM system may also provide one or more version indicator indicating that the content is a different version of content previously received by the CLM system.

In some embodiments, the CLM system determines whether the content received by the CLM system includes a content record that refers to another content record not included in the content received by the CLM system. If the CLM system determines that the content includes a content record that refers to another content record not included in the content, the CLM system may consider and/or treat the content as bad or inconsistent (e.g., lacking in referential integrity). In some embodiments, the CLM system may provide a status indicator indicating that the content and/or content record is bad or inconsistent (e.g., lacking in referential integrity).

If the at least one identifier includes a local identifier, the CLM system may determine whether the local identifier has already been mapped to a CLM or global identifier. In some embodiments, if the local identifier has already been mapped to a CLM or global identifier, the CLM system determines a CLM or global identifier based at least in part on the mapping. In some embodiments, if the local identifier has not already been mapped to a CLM or global identifier, the CLM system generates a one to one mapping from the local identifier to a CLM identifier. In some embodiments, the one-to-one mapping from local identifier to CLM identifier is one-to-one in the context of one CLM system and the second processing system. In some embodiments, if the local identifier has not already been mapped to a CLM or global identifier, the CLM system assumes the content entity in question has not previously been checked in to the CLM system; it then generates a global identifier for that entity, stores it in its repository, and creates a mapping entry relating the received local identifier to the newly generated global identifier.

In some embodiments, if the at least one identifier is a local identifier, the CLM system 101 determines that the content is another version (another copy of same version or a different (e.g., newer) version) of content previously received by the CLM system 101 only if the CLM system has a global identifier to which the at least one identifier has been mapped.

The CLM system may receive information indicating that a processing system (e.g., one of processing systems 102-112) is to receive the content. As further described herein, in some embodiments, the information may be supplied by a graphical user interface in response to input from a user (e.g., an administrator).

Thereafter, the CLM system 101 may transmit the content, at least one identifier and version information to the processing system. The content may be transmitted all at once or in parts. The at least one identifier transmitted by the CLM system may be based at least in part on the at least one identifier received by the CLM system 101 and may be transmitted with or separate from the content.

In some embodiments, the CLM system determines whether any of at least one CLM identifiers associated with the content are mapped to a local identifier for the processing system to which the content is to be transmitted. If so, each CLM identifier that is so mapped may be replaced by the local identifier to which it is mapped.

In some embodiments, the version information indicates whether the transmitted content is another version of content that has been previously transmitted by the CLM system to the processing system. In some embodiments, the content is a same or different (e.g., newer) version as previously received by the processing system.

In some embodiments, the version information may be anything that could be used to indicate whether the transmitted content is another version of content that has been previously transmitted by the first processing system to the third processing system. In some embodiments, it could be a flag that indicates whether or not the content is new, or a revision/update or a deletion. In some embodiments, it could be a version number or anything else that indicates whether the transmitted content is another version of content that has been previously transmitted by the first processing system to the third processing system. Thus, in some embodiments, it may indicate an actual version. In some other embodiments, it may not.

In some embodiments, the content may comprise an entire content group received from the second processing system. In some other embodiments, the content may comprise only a portion of a content group that is received from the second processing system.

In some embodiments, the transmitting of content and at least one identifier may be performed by deploying the content and at least one identifier from the CLM system to the processing system as further described herein.

Figure 3:
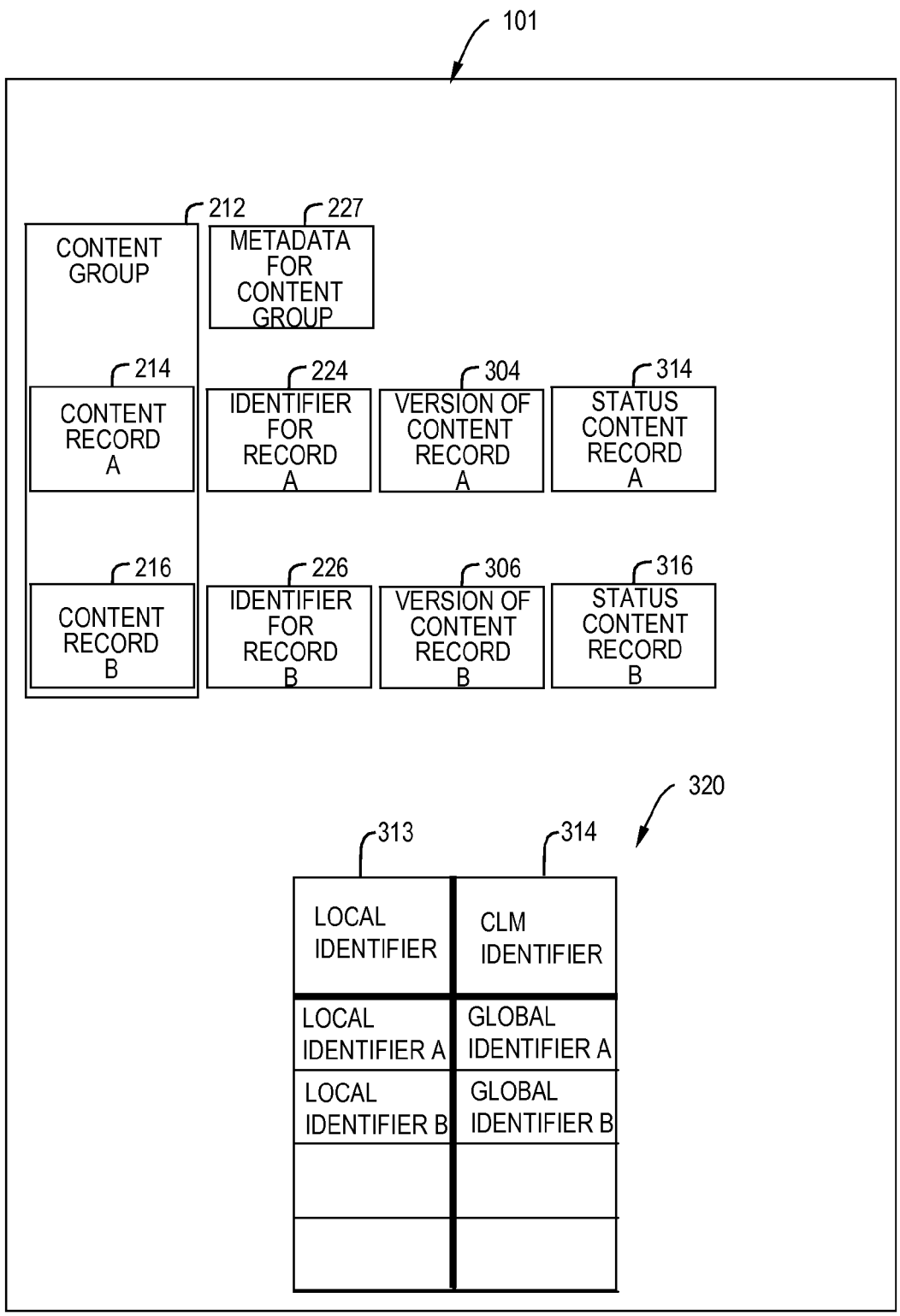
FIG. 3 is a block diagram of a portion of a processing system according to some embodiments.

FIG. 3 is a block diagram of a portion of a CLM system, e.g., CLM system 101, in accordance with some embodiments.

Referring to FIG. 3, in accordance with some embodiments, and as stated above, the CLM system 101 may receive the content 212, the one or more identifiers 224-226, and the metadata 227. The CLM system may generate the version indicator 304 and version indicator 306, which may be indicative of the version of content record A and the version of content record B, respectively. The CLM system may also generate the status indicator 314 and the status indicator 316, which may be indicative of the status (e.g., good/bad) of content record A and the status of content record B, respectively.

As stated above, in some embodiments, the one or more identifiers received from the processing system may be local identifiers rather than CLM or global identifiers.

If either of the identifiers 224, 226 is a local identifier, the CLM system may determine whether the local identifier has already been mapped to a CLM or global identifier. If the local identifier has already been mapped to a CLM or global identifier, the CLM system may determine a CLM or global identifier based at least in part on the mapping. If the local identifier has not already been mapped to a CLM or global identifier, the CLM system generates a one to one mapping from the local identifier to a CLM identifier. The mapping is necessarily one-to-one only in the context of the CLM system and the local identifier's system; it may optionally also be one-to-one in wider contexts—for example, across an entire landscape.

Mapping 320 (represented in FIG. 3 by a table) is an example of a one to one mapping between local identifiers received from a processing system, e.g., processing system 106, and CLM or global identifiers generated by the CLM system in association with the processing system, e.g., processing system 106. That is, a mapping that associates each local identifier that has been received from a particular processing system with the CLM or global identifier that has been generated and is associated with and/or identifies the same content as the local identifier. In some embodiments, the CLM system 101 maintains a similar mapping for each processing system in the system or landscape 100.

In some embodiments, the CLM system stores information for a plurality of content groups. In some embodiments, the information stored for some or all of the content groups is the same and/or similar to the information shown in FIG. 3 for the content group 212.

Figure 4:
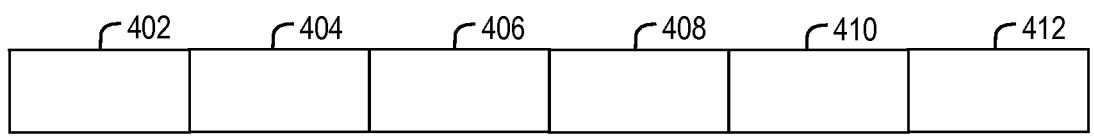
FIG. 4 is a block diagram of an identifier according to some embodiments.

FIG. 4 is a block diagram representation of a CLM or global identifier, in accordance with some embodiments.

Referring to FIG. 4, in accordance with some embodiments, a CLM or global identifier that is mapped to a local identifier may comprise a plurality of fields 402-412.

A first field 402 may comprise an originating vendor identifier. In some embodiments, the originating vendor identifier comprises a unique identifier assigned to the vendor of the content. In some embodiments, the unique identifier is set at the CLM repository level. An example of an originating vendor identifier is "SAP".

A second field 404 may comprise a repository identifier. In some embodiments, the repository identifier is an identifier of a CLM repository. An example of a repository ID is "Repo24". In some embodiments, the repository identifier defaults to a null string.

A third field 406 may comprise an authoring source identifier. In some embodiments, each adapter (which may be unique to each system/client configuration) from which checkpoints may originate may have a CLM name maintained as a CLM configuration. In some embodiments, the authoring source identifier field comprises the CLM name maintained as a CLM configuration. In some embodiments, the authoring source identifier field defaults to a null string. An example of an authoring source identifier is "OG (e.g., representing oil and gas).

A fourth field 408 may comprise an application namespace field. In some embodiments, the application namespace field may comprise the XML namespace of application metadata. In some embodiments, the fourth field 408 comprises a two part entity type. A first part may comprise the schema of the application under which the entity type is defined. The second part may comprise the name of the type. An example is "Grc/rm/1".

A fifth field 410 may comprise a content record type field. In some embodiments, the content record type field comprises an entity type corresponding to the content record type described in the application metadata. An example is "CRisk".

A sixth field 412 may comprise a content record instance field, sometimes referred to herein as a local ID. In some embodiments, the content record instance field comprises a number that distinguished the entity instance making it unique with the content group. In some embodiments, the sixth field 412 comprises an alphanumeric or other type of ID string. An example, is "1011".

Thus, an example of a complete CLM identifier in accordance with some embodiments, is "sap/repo24/og/grc/rm/1/crisk/1011".

In some embodiments, the namespace, content record and content record instance number, all each derived from the content extracted from the application instance. In some embodiments, the remaining fields may be derived from data obtained from the application registration and the CLM repository.

Figure 5:
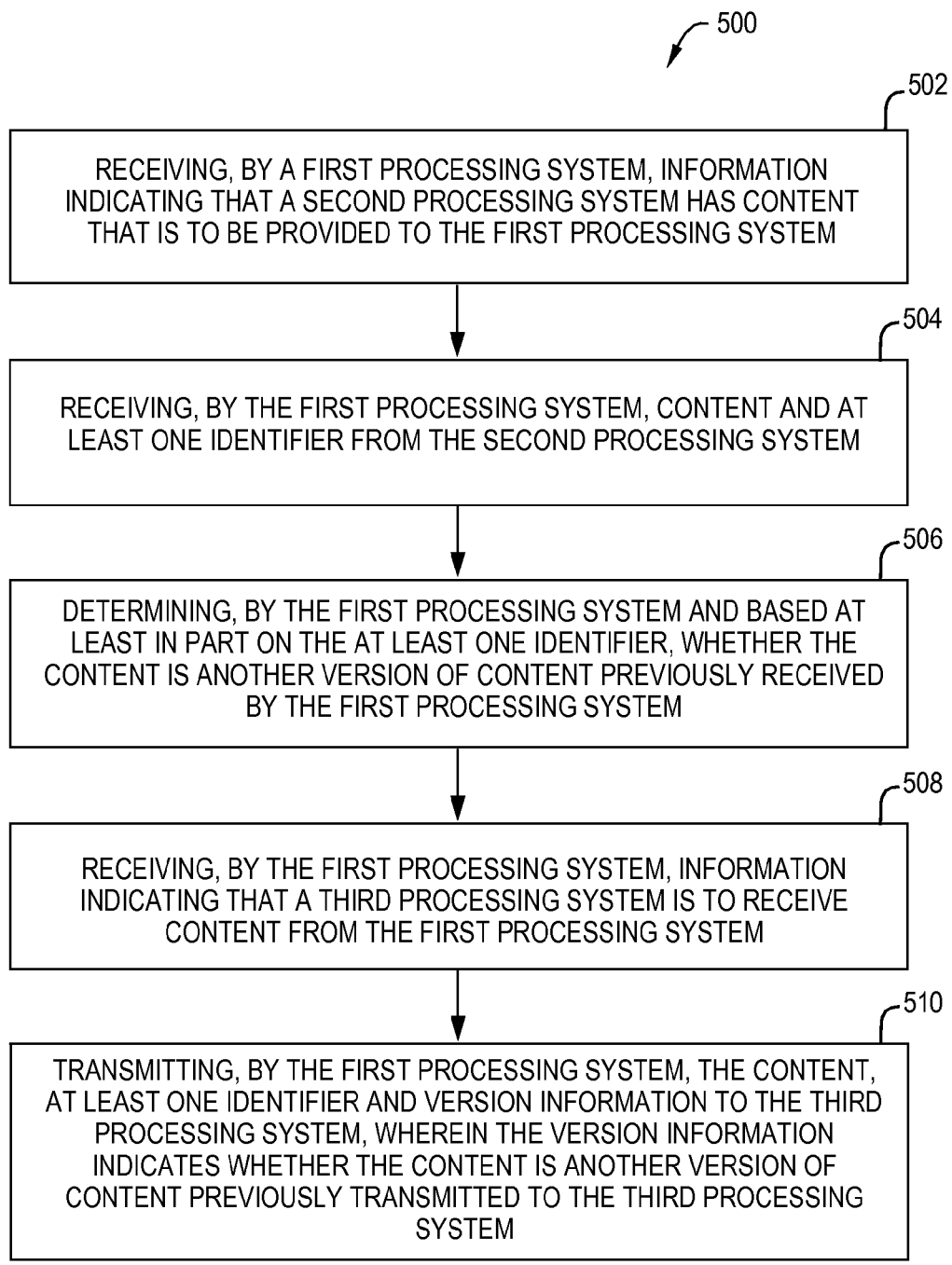
FIG. 5 is a flow chart of a method, in accordance with some embodiments.

FIG. 5 is a flow chart of a method, in accordance with some embodiments. In some embodiments, the method is performed by the CLM system 101 and used in transferring content, e.g., from one or more of the processing systems 112, to the same or a different one or more of the processing systems 112.

The method and of the other methods described herein may be performed by hardware, software (including low level language code), or any combination of these approaches. Moreover, a storage medium may store thereon instructions that when executed by a machine result in performance according to any of the embodiments described herein.

The method is not limited to the order shown in the flow chart. Rather, embodiments of the method, and any method disclosed herein, may be performed in any order that is practicable. Moreover, some embodiments may employ one or more portions of a method without one or more other portions of a method.

At 502, the method may include receiving, by a first processing system (e.g., CLM system), information indicating that a second processing system (e.g., one of processing systems 102-112) has content that is to be provided to the first processing system. The information may be supplied by a graphical user interface in response to input from a user (e.g., an administrator).

At 504, the method may further include receiving, by the first processing system (e.g., the CLM system 101), content and at least one identifier from the second processing system (e.g., one of processing systems 102-112). The content may be received all at once or in parts. The at least one identifier may identify the content and may be received together with, or separate from, the content.

In some embodiments, the content comprises a plurality of content records, and the at least one identifier comprises a plurality of identifiers, each one of the plurality of identifiers being associated with and identifying a respective one of the plurality of content records. If the at least one identifier includes a local identifier, a determination may be made as to whether the local identifier has already been mapped to a CLM or global identifier. If the local identifier has not already been mapped to a CLM or global identifier, a CLM or global identifier may be determined based at least in part on the mapping. If the local identifier has not already been mapped to a CLM or global identifier, a mapping from the local identifier to a CLM or global identifier may be generated.

In some embodiments, a determination may be made as to whether the received content includes a content record that refers to a content record not included in the received content received by the CLM system. If so, the content may be considered and/or treated as bad (e.g., lacking in referential integrity). In some embodiments, one or more status indicators may be generated to indicate whether the content and/or a content record is bad (e.g., lacking in referential integrity).

In some embodiments, the receiving is accomplished by extracting the content and at least one identifier from the second processing system (after receiving the information indicating that the second processing system has content to be provided to the first processing system (e.g., the CLM system) using a method further described herein. In some embodiments the receiving of content and the at least one identifier is performed using an extraction portion of a method described with respect to FIG. 10. In some embodiments, one or more other portions of the method of FIG. 10 may be performed before, after and/or in association with the extraction.

At 506, the method may further include determining, by the first processing system (e.g., the CLM system 101) and based at least in part on the at least one identifier, whether the content is another version of content previously received by the first processing system (e.g., the CLM system 101).

In some embodiments, the first processing system (e.g., the CLM system 101) may not have previously received a version of the content. In some other embodiments, the content may be a same version or a different (e.g., newer) version of content previously received by the system. In some embodiments, the method may determine that the content is another version of content previously received by the first processing system (e.g., the CLM system 101) only if the CLM system has received the at least one identifier from the processing system more than once. If the content is another version of content previously received by the first processing system (e.g., the CLM system 101), the method may further include comparing the content to the content previously received in order to determine whether the content is a same version of the content previously received or whether the content is a different (e.g., newer) version of the content previously received. One or more version indicators may be provided to indicate whether the content is a different version of content previously received.

At 508, the method may include receiving, by the first processing system (e.g., the CLM system 101), information indicating that a third processing system is to receive content from the first processing system (e.g., the CLM system 101). The information may be supplied by a graphical user interface in response to input from a user (e.g., an administrator).

At 510, the method may further include transmitting, by the first processing system (e.g., the CLM system 101), the content, at least one identifier and version information to the third processing system. The content may be transmitted all at once or in parts. The at least one identifier transmitted by the first processing system (e.g., the CLM system 101) may be based at least in part on the at least one identifier received by the first processing system (e.g., the CLM system 101) and may be transmitted with or separate from the content.

In some embodiments, the version information indicates whether the content is another version of content that has been previously transmitted by the first processing system (e.g., the CLM system 101) to the third processing system. In some embodiments, the content is a same or different (e.g., newer) version as previously received by the processing system.

As stated above, in some embodiments, the version information may be anything that could be used to indicate whether the transmitted content is another version of content that has been previously transmitted by the first processing system to the third processing system. In some embodiments, it could be a flag that indicates whether or not the content is new, or a revision/update or a deletion. In some embodiments, it could be a version number or anything else that indicates whether the transmitted content is another version of content that has been previously transmitted by the first processing system to the third processing system. Thus, in some embodiments, the version information may indicate an actual version. In some other embodiments, it may not.

In some embodiments, the at least one global identifier comprises a global identifier, and the determining whether the content is another version of content previously received by the first processing system comprises: determining, based at least in part on the global identifier that a version of the content has been previously received by the first processing system; and determining, based at least in part on the content, that the content is a same version or a different version of content previously received by the first processing system.

In some embodiments, the version of the content previously received comprises a plurality of records, and the method further comprises: comparing the content to the version of the content previously received to identify one or more of the following changes to the content compared to the version of the content previously received: a first one of the plurality of records in the content is a same version as a first one of the plurality of records in the version of the content previously received; a second one of the plurality of records in the content is a different version from a second one of the plurality of records in the version of the content previously received; a third one of the plurality of records in the content is not another version of any of the plurality of records in the version of the content previously received; or one of the plurality of records in the version of the content previously received is omitted from the plurality of records in the content. In some embodiments, the method further comprises:

providing a user interface to allow a user to reject one or more of the identified changes. In some embodiments, the method further comprises: transmitting content from the first processing system to the third processing system based at least in part on the users choices.

In some embodiments, the transmitting is accomplished by deploying the content and the at least one identifier to the processing system (after receiving the information indicating that the processing system is to receive content from the CLM system) using a method further described herein. In some embodiments the transmitting is performed using a deploying portion of a method described with respect to FIG. 10. In some embodiments, one or more other portions of the method of FIG. 10 may be performed before, after and/or in association with the deploying.

As stated above, in some embodiments, the information (e.g., indicating that a processing system has content that is to be provided and/or indicating that a processing system is to receive content) received by the CLM system may be supplied by a graphical user interface in response to input from a user (e.g., an administrator). In some embodiments, the information received by the CLM system may be supplied by a graphical user interface in response to input from a user (e.g., an administrator) as described hereinafter with respect to FIGS. 6-8.

Figure 6:
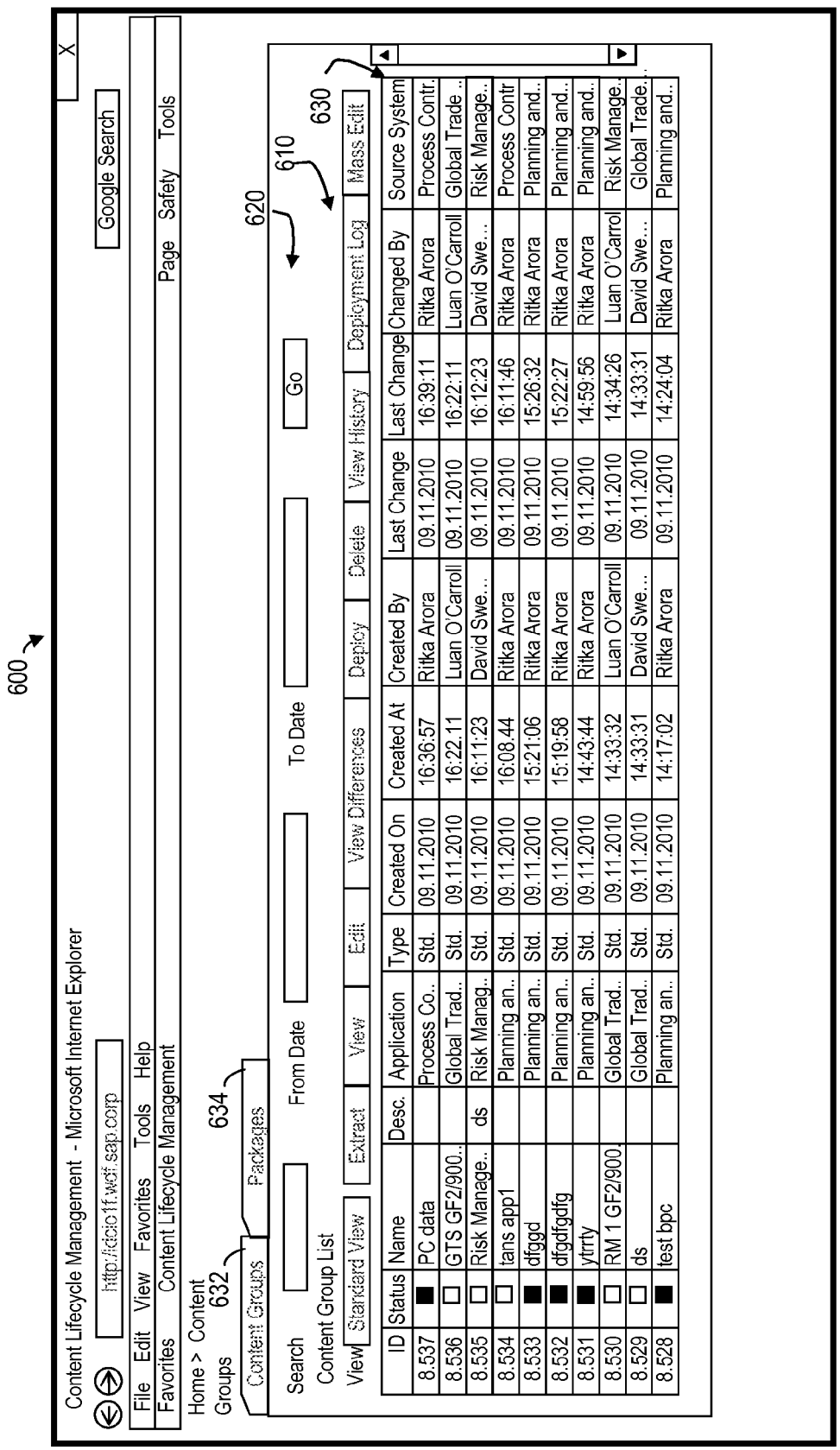
FIG. 6 is a representation of a view in a graphical user interface, in accordance with some embodiments.

FIG. 6 is a representation of a view 600 in a graphical user interface that may be used, in accordance with some embodiments.

Referring to FIG. 6, in accordance with some embodiments, the view 600 may include a plurality of graphical tools 610 (e.g., a tool to select a type of view that is desired for the view 600, and tools labeled Extract, View, Edit, View Differences, Deploy, Delete, View History, Deployment Log and Mass Edit). Activation of one of the tools 610, e.g., the tool labeled Extract, may request a view that may be used to request and/or otherwise indicate content to be transferred to the CLM system 101 from one of the processing systems 102-112.

Figure 7:
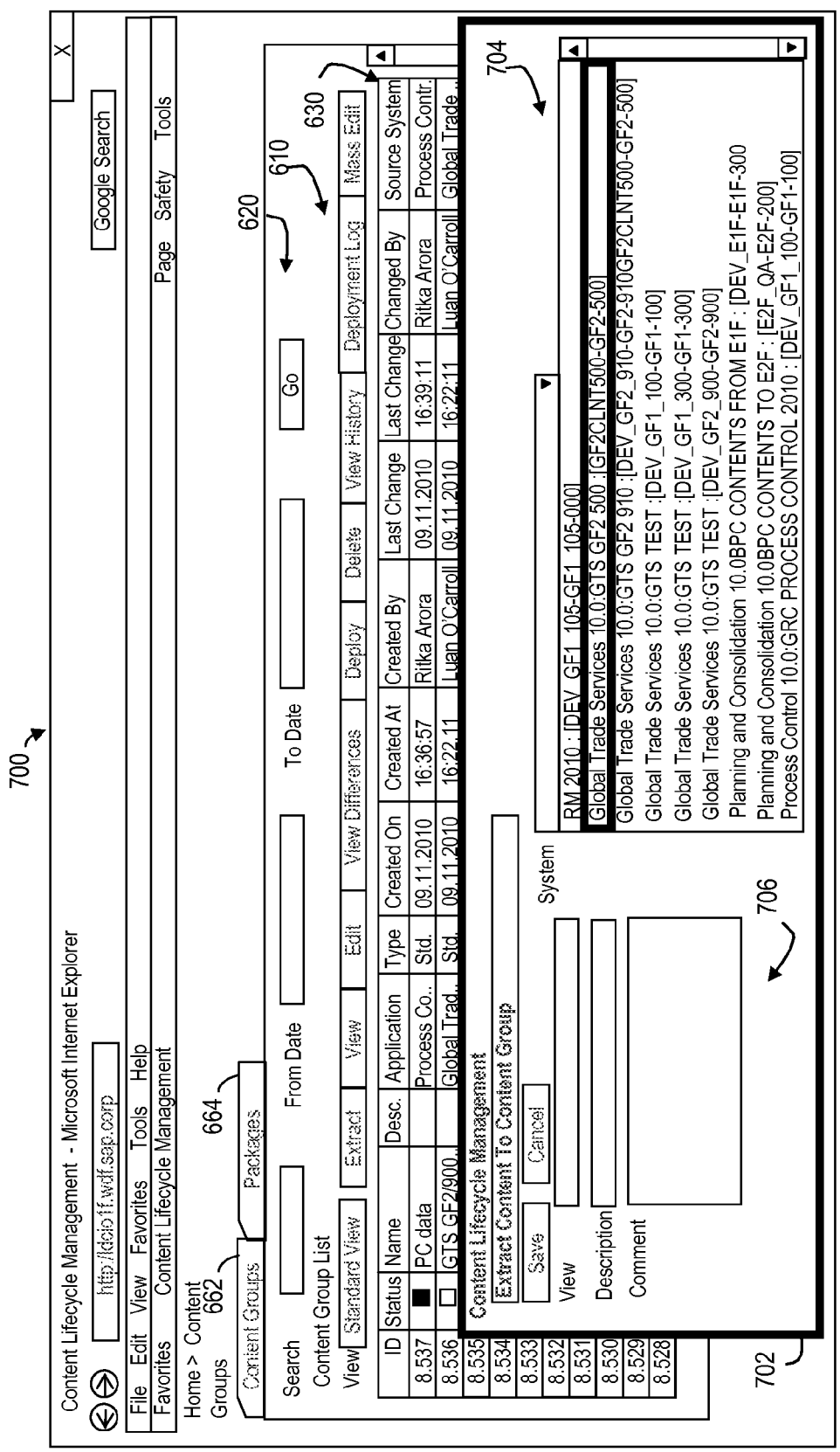
FIG. 7 is a representation of a view in a graphical user interface, in accordance with some embodiments.

FIG. 7 is a representation of a view 700 in a graphical user interface that may be provided in response to a request for a view that may be used to request and/or otherwise indicate content to be transferred to the CLM system 101 from one of the processing systems 102-112.

Referring to FIG. 7, in some embodiments, the view 700 may include a window 702 that may be used to request and/or otherwise indicate content to be transferred to the CLM system 101 from one of the processing systems 102-112.

The window 702 may include a graphical tool 704 that may be used to select a particular processing system that includes the content that is to be provided to the CLM system 101. In some embodiments, the graphical tool 704 comprises a drop down menu that lists names of processing systems that have been registered with the CLM system 101. The graphical tool 704 may allow selection of a name of one of the listed processing systems. The second processing system in the list is shown selected.

The window 702 and/or another window (not shown) may include a graphical tool (not show) that may used to select a particular application that is on the selected processing system and includes and/or otherwise has access to the content that is to be provided to the CLM system 101. In some embodiments, such graphical tool comprises a drop down menu that lists names of applications that are on the selected processing system and that have been registered with the CLM system 101. The graphical tool may allow selection of a name of one of the listed applications.

The window 702 may further include a plurality of graphical tools 706 that allow a user to select a view (e.g., a text box labeled "View"), provide a description of the content to be transferred to the CLM system 101 (e.g., a text box labeled "Description"), provide a comment associated with the content (e.g., a text box labeled "Description"), request transfer of the content the CLM system 101 (e.g., a graphical tool labeled "Save"), and/or cancel the request for the view 700 (e.g., a graphical tool labeled "Cancel").

If the user requests that the content be transferred to the CLM system (e.g., a graphical tool labeled "Save"), the CLM system may then extract the specified content from the selected application. As further described herein, in some embodiments, a subset of content exposed by the application may be controlled by the application and returned or otherwise transferred to the CLM system via XML.

Referring again to FIG. 6, activation of another one of the tools 610, e.g., the tool labeled Deploy, may request a view that may be used to request and/or otherwise indicate a processing system to which content is to be transferred to from the CLM system 101.

In some embodiments, prior to activating such graphical tool, e.g., the tool labeled Deploy, one or more graphical tools may be used by a user to select and/or otherwise indicate the content to be transferred to the processing system 102-112 from the CLM system 101.

In that regard, the view 600 may include a plurality of graphical tools 620 to specify a search criteria (e.g., a tool to specify a search string, a tool to specify a "from date" (e.g., an earliest date of creation or last change), a tool to specify a "to date" (e.g., a latest date of creation or last change), and a tool, e.g., a tool labeled "go", that may be activated to initiate performance of the search).

The view 600 may further include a table 630 showing some or all results of the search. In some embodiments, the search may be performed on the content groups (e.g., received from processing systems within the system 100) and/or on packages (e.g., received from other landscapes). In some embodiments, the table 630 may show results of the search on content groups if a graphical tool 632 (e.g., shown as a tab labeled content groups) has been activated, and may show results of the search on packages if a graphical tool 634 (e.g., shown as a tab labeled packages) has been activated.

In some embodiments, the table 630 may include a plurality of rows and a plurality of columns. The first row may define a header that includes a plurality of titles (e.g., ID, Status, Name, Description, Application, Type, Created On, Created By, Last Change Date, Last Change Time, Changed By and Source System), each of which may be associated with a respective one of the plurality of columns and may indicate the type of information that is listed in the respective one of the plurality of columns.

Each of the other rows may define a line item (sometimes referred to herein as an entry) that includes an ID, a Status, a Name, a Description, an Application, a Type, a Created On, a Created By, a Last Change Date, a Last Change Time, a Changed By and a Source System associated with particular content (e.g., a particular content group or package). The ID may indicate an ID assigned to and/or otherwise associated with the particular content, the Status may indicate a status for the particular content (e.g., where good is indicated by a green or clear indicator and bad is indicated by a red or dark indicator), the Name may indicate a name assigned to and/or otherwise associated with the particular content, the Description may indicate a description for the content, the Application may identify an application (e.g., run and/or executed by one of a processing systems 102-112) from which the particular content was received, the Type may indicate a type of classification for the particular content, the Created On and Created at may indicate a date and a time, respectively, that a first version of the particular content was stored in the CLM system 101, the Last Change Date and a Last Change Time may indicate a date and a time, respectively, that a last version of the particular content was stored in the CLM system 101, the Changed By may indicate a name of a person that made and/or otherwise requested the last change to the particular content, and a Source System may indicate a name of a processing system that runs and/or otherwise executes the application from which the particular content is received.

In some embodiments, a user may select an entry in the table to select and/or otherwise indicate the content to be transferred to the processing system 102-112 from the CLM system 101. FIG. 52 described below, shows the third line item of the table 630 as being selected.

Thereafter, one of the graphical tools 610, e.g., the tool labeled Deploy, may be activated to request the view that may be used to request and/or otherwise indicate a processing system to which the selected content is to be transferred.

Figure 8:
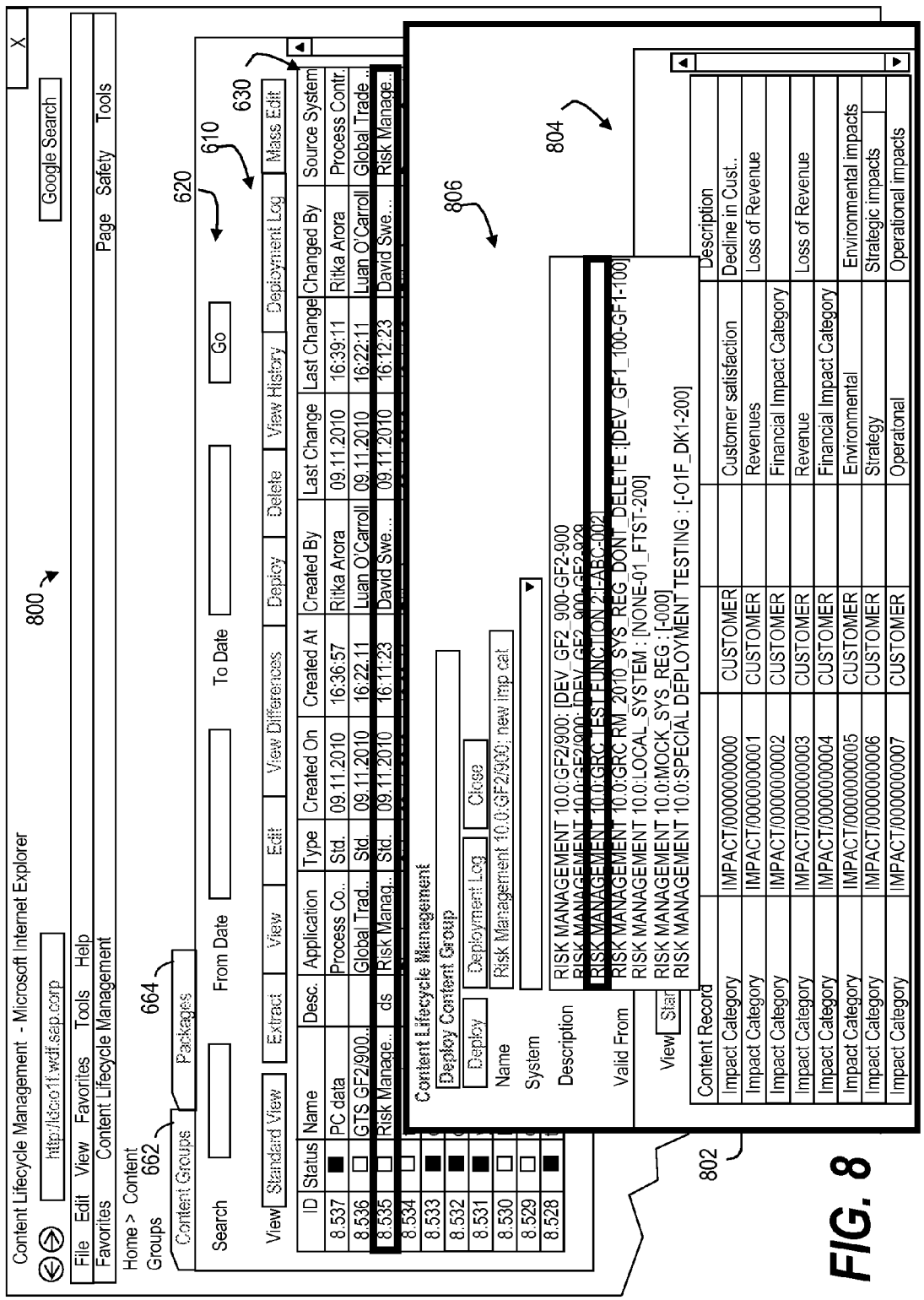
FIG. 8 is a representation of a view in a graphical user interface, in accordance with some embodiments.

FIG. 8 is a representation of a view 800 in a graphical user interface that may be provided in response to a request for the view that may be used to request and/or otherwise indicate a processing system to which the selected content is to be transferred.

Referring to FIG. 8, in some embodiments, the view 800 may include a window 802 that may be used to request and/or otherwise indicate the processing system to which the selected content is to be transferred.

The window 802 may include a graphical tool 804 that may be used to select the particular processing. In some embodiments, the graphical tool 804 comprises a drop down menu that lists names of processing systems that have been registered with the CLM system 101. The graphical tool 804 may allow selection of a name of one of the listed processing systems. The third processing system in the list is shown selected.

The window 802 may further include a plurality of graphical tools 806 that allow a user to request that the content be transferred to the selected processing system (e.g., a graphical tool labeled "Deploy"), to request a deployment log (e.g., a graphical tool labeled "Deployment Log"), and/or to close the window 802 without transferring the content (e.g., a graphical tool labeled "close").

If the user requests that the content be transferred to the selected processing system (e.g., a graphical tool labeled "Deploy"), the content may then be transferred to the selected processing system for deployment.

As stated above, in some embodiments, the content received by the CLM system 101 may be another version (i.e., a same version or a different version) of content previously received by the CLM system 101. If the content is a different version of content previously received, the content may be viewed as having one or more changes compared to the content previously received. In some embodiments, the CLM system may provide a user with the ability to indicate that the content is to be transferred to another processing system without one or more of the changes. In some embodiments, the CLM system may provide the ability to accept or reject the changes on a content record by content record basis.

Figure 19:
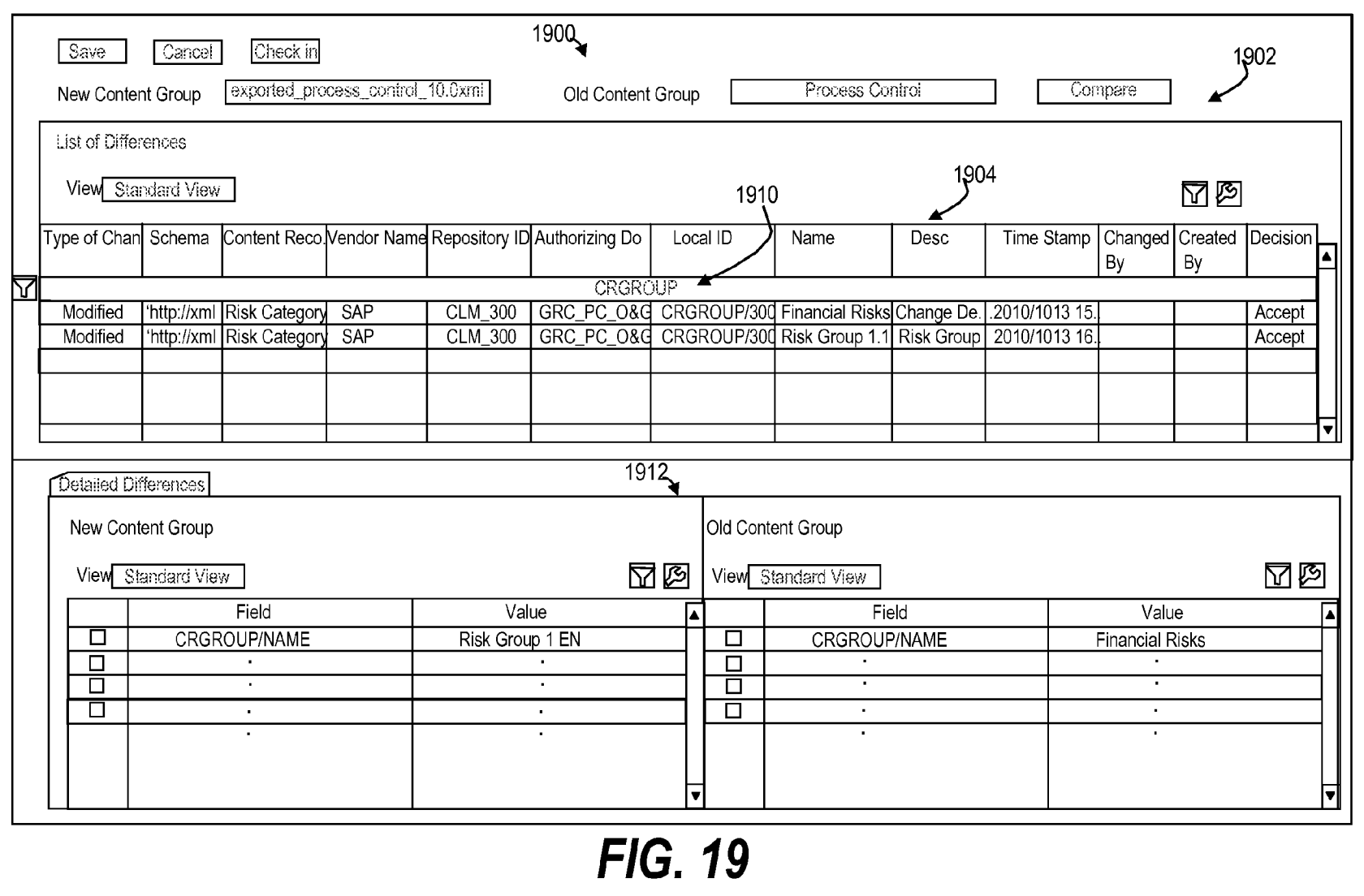

FIG. 19 is a representation of a view 1900 in a graphical user interface that may provide a user with the ability to indicate that content is to be transferred to another processing system without one or more of the changes, in accordance with some embodiments.

Referring to FIG. 19, in some embodiments, the view 1900 includes a first area 1902 that identifies a name of a first content group (e.g., exported process control 10.0×ml) and a name of a second content group (e.g., Process Control). The area 1902 may further include a graphical tool (e.g., a button labeled compare) activation of which may initiate a comparison between the content records in the first content group (e.g., exported process control 10.0×ml) and the content records in the second content group (e.g., Process Control).

In some embodiments, the comparison may determine, for each content record in the first content group, whether the content record is a same version as a content record in the second content group, a different version from a content record in the second content group and/or not another version of any content records in the second content group. In some embodiments, the comparison may also determine all of the content records in the second content group that are omitted from the first content group.

In some embodiments, each content record in the first content group will be compared to a content record that is in the second content group and has the same global identifier as that of the content record in the first content group, if such a content record in the second content group exists. Thus, in some embodiments, the comparison compares content records having matching global identifiers.

A content record in the first content group that is a same version as a content record in the second content group is sometimes referred to herein as an unchanged content record. A content record in the first content group that is a different version from a content record in the second content group is sometimes referred to herein as an updated or modified content record. A content record in the first content group that is not another version of any content record in the second content group is sometimes referred to herein as a new or added content record. A content record in the second content group that is omitted from the first content group is sometimes referred to herein as a deleted content record.

The view 1900 may further include a table 1904 that indicates one or more results of the comparison. In some embodiments, the table 1904 may include a plurality of rows and a plurality of columns. The first row may define a header that includes a plurality of titles (Type of Change, Schema, Content Record, Vendor Name, Repository ID, Authorizing Do . . . , Local ID, Name, Description, Time Stamp, Changed By, Created By and Decision), each of which may be associated with a respective one of the plurality of columns and may indicate the type of information that is listed in the respective one of the plurality of columns. Each of the other rows may define a line item (sometimes referred to herein as an entry) that is associated with a content record in the first content group and/or second content group and indicates whether the content record is changed and if so, the type of change. Each line item or entry may include a graphical tool (e.g., a graphical tool disposes in a column (e.g., the Decision column)) to indicate a user's choice as to whether to accept or reject the change associated with the content record.

Although the illustrated embodiment of table 1904 happens to include only changes that are updates (modified), for some comparisons of some content, the table 1904 may include updates, additions and/or deletions all in the same table.

In some embodiments, the comparison and/or results are limited to content records that satisfy a search criteria 1910 (e.g., as indicated by a graphical tool labeled CRGROUP)

In some embodiments, the view 1900 may further include a second area 1912 that provide further details regarding changes. In some embodiments, the content record in the first content group and the content record in the second content group each have a field and a value associated with the field. If a change is an update, the value associated with a field in the first content group may be different than the value associated with the field in the second content group.

In some embodiments, content is transmitted from the CLM system 101 to another processing system based at least in part on the users choice(s). In some embodiments, if a user chooses to reject a change that is an update, the updated content record is not included in the content transmitted from the CLM system 101 to the other processing system. In some embodiments, if a user chooses to reject a change that is an addition, the new or added content record is not included in the content transmitted from the CLM system 101 to the other processing system. In some embodiments, if a user chooses to reject a change that is a deletion, the deleted content record is not omitted from the content transmitted from the CLM system 101 to the other processing system.

In some embodiments, the CLM system interacts with applications that are executed by a processing system.

To that effect, in some embodiments, the CLM system defines an application programming interface (API) for exchange of information and/or for configuring interaction between the CLM system and an application or applications executed by a processing system.

In some embodiments, one or more applications of one or more of the processing systems implement at least some of the API's defined by the CLM system in order to exchange information with and/or configure an interaction between the CLM system and the one or more applications of the one or more processing systems.

Table 1 shows an API that may be defined by the CLM system for exchange of information and/or for configuring interaction between the CLM system and an application of a processing system, in accordance with some embodiments is set forth below in Table 1.

As will be further described below, in some embodiments, an adapter is used to implement one or more of the API's defined by the CLM system.

TABLE 1

| ID | Function Signature | Description |
|---|---|---|
| 1 | methods GET_METADATA<br>   exporting<br>      value(EV_METADATA) type XSTRING<br>      value(ET_BAPIRET) type BAPIRET2_T . | Fetches the metadata as an XSD schema. In some embodiments, the CLM system and/or an ABAP system do not provide XSD validation and therefore not all rules expressed in the XSD can be enforced. In some embodiments, more XSD validation is provided so that all (or at least more) of the rules expressed in the XSD can be enforced. In some embodiments, CLM does enforce some of the XSD rules and there are some implicit restrictions on the content. Entity Types Each managed entity in CLM must extend the clm:entity type. The clm.xsd schema specifies the common entity and field types. Required Fields Each entity must include an ID attribute and this ID must be unique within the XML document Each enity must include the NAME and DESCR fields, these fields can include a LANG attribute Entity Order The entities must match the order specified in the XSD and all entities of a particular type should be contiguous. In addition if the entities are referred to by KeyRefs, they should appear in the content prior to the use of those KeyRefs - no forward references are permitted. Field Order The field order must match the order specified in the XSD. Excel Restriction Excel cannot support choice elements within the XSD. Keys and KeyRefs KeyRefs should be of the type clm:field or another simple type. XSD can only express a single KeyRef in a given element. If a type has multiple relations, a wrapper element needs to be inserted. Namespaces The metadata must follow the SAP namespace conventions, for example, xmlns="http://xml.sap.com/2010/06/sbc/clm/grc/rm/1.0" |
| 2 | methods EXTRACT_CONTENT<br>   importing<br>      value(IV_JOB_ID) type CHAR LENGTH 32<br>   exporting<br>      value(EV_CONTENT) type XSTRING<br>      value(EV_HAS_MORE) type SAP_BOOL<br>      value(ET_BAPIRET) type | Content extraction can be performed in chunks. An extract job or session is opened and any parameters need for the query are passed when the job is created. CLM calls the EXTRACT_CONTENT function as many times as is necessary to fetch all the content. Once all the content has been extracted, it is |

TABLE 1-continued

| ID | Function Signature | Description |
|---|---|---|
|  | BAPIRET2_T . | processed by CLM.<br>The adapter may implement the option END_EXTRACT function to perform cleanup, or it may perform that cleanup when the last chunk has been extracted and omit the END_EXTRACT function.<br>Extract a chunk of content for this job. When no more content is available, a value of ABAP_TRUE should be returned in the EV_HAS_MORE parameter. If the extract is interrupted, CLM stops and does not automatically attempt to resend chunks.<br>IV_JOB_ID A GUID identifying the extract job<br>IV_QUERY XML containing query information (XSD to be defined by the POA)<br>IV_MAX_CHUNK_SIZE The maximum number of bytes that CLM can accept as a single chunk of content<br>ET_BAPIRET Standard table of BAPIRET messages, returning error and warning information |
| 3 | methods DEPLOY_CONTENT<br>  importing<br>    value(IV_JOB_ID) type CHAR LENGTH 32<br>    value(IV_TEST) type SAP_BOOL optional<br>    value(IV_CONT_DEPLOY) type SAP_BOOL optional<br>    value(IV_VALID_FROM) type DATUM optional<br>    value(IV_VALID_TO) type DATUM optional<br>  exporting<br>    value(ET_BAPIRET) type BAPIRET2_T . | Start deployment of the content.<br>Content deployment is asynchronous if the GET_STATUS method is implemented. CLM will poll the application adapter for status via the GET_STATUS method (if provided) until the method indicates that the deployment has completed or failed. Once the deployment has finished the results are fetched with the GET_RESULTS method. If the GET_STATUS method is not implemented then it is assumed that the deployment is synchronous and that CLM will call GET_RESULTS once the DEPLOY_CONTENT method returns.<br>The deployment can be run in test mode when the IV_TEST mode is set to true. In test mode the application adapter should not actually deploy to the database. The test mode should return as much error and warning information as possible.<br>The IV_CONT_DEPLOY option is set to true if a user attempts to deploy a content group that has previously failed to deploy because of warnings (indicated by a GET_RESULTS value of W)<br>IV_JOB_ID A GUID identifying the extract job<br>IV_TEST ABAP_TRUE to perform the deployment in test mode (without committing the results)<br>IV_CONT_DEPLOY ABAP_TRUE to Continue deployment in case of warnings if applications chose to do so<br>IV_VALID_FROM Validity from date for content deployment<br>IV_VALID_TO Validity to date for content deployment - default 99991231<br>ET_BAPIRET Standard table of BAPIRET messages, returning error and warning information |
| 4 | methods SETUP<br>  importing<br>    value(IV_CONFIG) type XSTRING<br>  exporting<br>    value(ET_BAPIRET) type BAPIRET2_T . | Setup the adapters, passing configuration information via XML.<br>Configuration values include:<br>REPOSITORY_NAME: The name of the CLM repository.<br>MAX_EXTRACT_CHUNK: The maximum chunk size that CLM can provide during content extraction (in bytes).<br>MAX_UPLOAD_CHUNK: The maximum chunk size that CLM can upload (in bytes).<br>IMG_VALUES: Any values from IMG that may be used in extract or upload of content, or for content validation. |

TABLE 1-continued

| ID | Function Signature | Description |
|---|---|---|
| 5 | methods GET_VERSION<br>  exporting<br>    value(EV_VERSION) type I<br>    !ET_BAPIRET type BAPIRET2_T | OPTIONAL FUNCTION<br>Gets a version number for the implementation |
| 6 | methods GET_QUERY_INFO<br>  exporting<br>    value(EV_CONTENT) type XSTRING<br>    value(ET_BAPIRET) type BAPIRET2_T . | OPTIONAL FUNCTION<br>Get the necessary information to form a query of the content.<br>EV_CONTENT XML containing information needed to form a query string for the content supported by this adapter (XSD to be defined by the POA)<br>ET_BAPIRET Standard table of BAPIRET messages, returning error and warning information |
| 7 | methods START_EXTRACT<br>  importing<br>    value(IV_JOB_ID) type CHAR LENGTH 32<br>    value(IV_QUERY) type XSTRING<br>    value(IV_MAX_CHUNK_SIZE) type INT4<br>  exporting<br>    value(ET_BAPIRET) type BAPIRET2_T . | OPTIONAL FUNCTION<br>Start content extraction.<br>The query parameter is taken from information derived from the GET_QUERY_INFO function and is not processed directly by CLM as noted above.<br>No XSD is provided by CLM for the IV_QUERY parameter by CLM.<br>IV_JOB_ID A GUID identifying the extract job<br>IV_QUERY XML containing query information (XSD to be defined by the POA)<br>IV_MAX_CHUNK_SIZE The maximum number of bytes that CLM can accept as a single chunk of content<br>ET_BAPIRET Standard table of BAPIRET messages, returning error and warning information |
| 8 | methods END_EXTRACT<br>  importing<br>    value(IV_JOB_ID) type CHAR LENGTH 32<br>  exporting<br>    value(ET_BAPIRET) type BAPIRET2_T . | OPTIONAL FUNCTION<br>Extract is complete and the adapter can cleanup any resources used during the extract.<br>IV_JOB_ID A GUID identifying the extract job<br>ET_BAPIRET Standard table of BAPIRET messages, returning error and warning information |
| 9 | methods GET_STATUS<br>  importing<br>    value(IV_JOB_ID) type CHAR LENGTH 32<br>  exporting<br>    value(EV_RESULTS) type BTCSTATUS<br>    value(ET_BAPIRET) type BAPIRET2_T . | OPTIONAL FUNCTION<br>The status of the content associated with a job can be checked at various times, for example following upload or following deployment.<br>If the function is not supplied it is assumed that the upload and deploy functions are synchronous. If the GET_STATUS API is not implemented then the status is set based on the messages in the GET_RESULTS API. If any of the messages in the results has a status of 'E', the status of the whole content associated with the job is marked as 'E' (Error).<br>IV_JOB_ID A GUID identifying the extract job<br>EV_RESULTS The job status: Type BTCSTATUS<br>Expected values:<br>F—Failed<br>S—Successful<br>P—In Progress<br>X—Unknown (when, for example, CLM job ID does not exist)<br>W—Continue deployment in case of warnings (BPC scenario)<br>ET_BAPIRET Standard table of BAPIRET messages, returning error and warning information |
| 10 | methods START_UPLOAD<br>  importing<br>    value(IV_JOB_ID) type CHAR LENGTH 32<br>    value(IV_LANG) type CHAR LENGTH 2<br>    value(IV_METADATA) type XSTRING<br>    value(IV_QUERY) type XSTRING | OPTIONAL FUNCTION<br>Start content extraction.<br>The query parameter is taken from information derived from the GET_QUERY_INFO function and is not processed directly by CLM as noted above. |

TABLE 1-continued

| ID | Function Signature | Description |
|---|---|---|
| | exporting<br>    value(ET_BAPIRET) type BAPIRET2_T. | No XSD is provided by CLM for the IV_QUERY parameter by CLM.<br>IV_JOB_ID A GUID identifying the extract job<br>IV_LANG The master language. The ISO 639-1 language code.<br>IV_METADATA XML containing the XSD schema for the content that is uploaded as part of this upload job. The schema supplied should match the one registered for the extract and outlined above (see 2.5.2).<br>IV_QUERY The query that was used to create the content group.<br>ET_BAPIRET Standard table of BAPIRET messages, returning error and warning information |
| 11 | methods END_UPLOAD<br>  importing<br>    value(IV_JOB_ID) type CHAR LENGTH 32<br>  exporting<br>    value(ET_BAPIRET) type BAPIRET2_T. | OPTIONAL FUNCTION<br>End content upload. The adapter may free any resources used during the upload once this function has been invoked.<br>IV_JOB_ID A GUID identifying the extract job<br>ET_BAPIRET Standard table of BAPIRET messages, returning error and warning information |
| 12 | methods UPLOAD_CONTENT<br>  importing<br>    value(IV_CONTENT) type XSTRING<br>    value(IV_JOB_ID) type CHAR LENGTH 32<br>  exporting<br>    value(ET_BAPIRET) type BAPIRET2_T.<br>    !ET_BAPIRET type BAPIRET2_T | Upload a chunk of content. If the adapter supports chunking of content it should not process the content until the upload has completed.<br>IV_JOB_ID A GUID identifying the extract job<br>IV_CONTENT A chunk of content. The complete upload contains an XML document that conforms to the XSD uploaded by the START_UPLOAD method<br>ET_BAPIRET Standard table of BAPIRET messages, returning error and warning information |
| 13 | methods GET_QUERY_INFO<br>  exporting<br>    value(EV_CONTENT) type XSTRING<br>    value(ET_BAPIRET) type BAPIRET2_T. | OPTIONAL FUNCTION<br>Get the necessary information to form a query of the content.<br>EV_CONTENT XML containing information needed to form a query string for the content supported by this adapter (XSD to be defined by the POA)<br>ET_BAPIRET Standard table of BAPIRET messages, returning error and warning information |
| 14 | methods RELEASE_JOB<br>  importing<br>    !IV_JOB_ID type CHAR LENGTH 32<br>  exporting<br>    !ET_BAPIRET type BAPIRET2_T. | Release the job and free any resource associated with the job. Following invocation of this function, the adapter is not expected to track the job status anymore.<br>IV_JOB_ID A GUID identifying the extract job<br>ET_BAPIRET Standard table of BAPIRET messages, returning error and warning information |
| 15 | methods GET_RESULTS<br>  importing<br>    value(IV_JOB_ID) type CHAR length 32<br>  exporting<br>    value(EV_RESULTS) type XSTRING<br>    value(ET_BAPIRET) type BAPIRET2_T. | Fetch the results of the deployment, including the ID mapping.<br>IV_JOB_ID A GUID identifying the extract job<br>EV_RESULTS XML containing the results of the deployment, the mapping of IDs for new entities and any error or warning information about entities delivered as part of the job (XSD to be defined)<br>ET_BAPIRET Standard table of BAPIRET messages, returning error and warning information |
| 16 | methods GET_ADAPTER_INFO<br>  exporting<br>    value(EV_CONFIG) type XSTRING | Get adapter configuration information, including any application or adapter-specific information and/or IMG values and other |

TABLE 1-continued

| ID | Function Signature | Description |
|---|---|---|
| | value(ET_BAPIRET) type BAPIRET2_T . | information that might be consumed by the mass edit adapter.<br>Required configuration values include:<br>METADATA_VERSION: Identifies the schema and version of the metadata that this adapter supports.<br>MAX_EXTRACT_CHUNK: The maximum chunk size that the adapter can provide during content extraction; a value of −1 indicates that CLM should not use chunking (in bytes).<br>MAX_UPLOAD_CHUNK: The maximum chunk size that the adapter can accept during upload; a value of - 1 indicates that CLM should not use chunking (in bytes).<br>HAS_QUERY_SUPPORT: A flag indicating if the adapter and POA support selective retrieval of content.<br>HAS_CHUNK_SUPPORT: A flag indicating if the adapter and POA support extract and upload of content in chunks, defaults to ABAP_FALSE.<br>HAS_TEST_SUPPORT: a flag indicating if the test flag on the deploy function is supported. If true, the adapter should not commit anything during the deployment; it defaults to ABAP_FALSE.<br>VERSION_NUMBER: An integer value indicating the version of the adapter implementation.<br>MASTER_LANG: A two character ISO language code for the content master language (optional)<br>ACCEPTS_DELTA: A flag indicating if CLM should send a delta or the full Content Group on deployment; it defaults to ABAP_TRUE<br>Where<br>EV_CONFIG: XML containing information about the configuration supported by this adapter, plus instance specific data needed for validation of content (XSD to be defined) |
| 19 | methods UPLOAD_LOG<br>  importing<br>    value(IV_LOG) type XSTRING<br>    value(IV_JOB_ID) type CHAR LENGTH 32<br>  exporting<br>    value(ET_BAPIRET) type BAPIRET2_T . | OPTIONAL FUNCTION<br>Upload an error log so as to allow resolution of problems with the content.<br>This API is intended for use in the mass-edit scenario and it is not expected that adapters will normally implement the API. The information uploaded is expected to be the information obtained from an attempted deployment and returned by the get_results API.<br>Where<br>IV_JOB_ID: A GUID identifying the extract job<br>IV_LOG: The XML returned by a call to GET_RESULTS<br>ET_BAPIRET: Standard table of BAPIRET messages, returning error and warning information |
| 21 | methods GET_TEMPLATE<br>  exporting<br>    value(EV_TEMPLATE) type XSTRING<br>    value(ET_BAPIRET) type BAPIRET2_T . | OPTIONAL FUNCTION<br>The mass-edit or XML/Excel upload/download function supported by CLM requires that a mapping between the metadata (XSD) and Excel is provided via the adapter. The GET_TEMPLATE function provides that template as a macro-enabled Excel workbook (.xlsm format). The workbook should contain no content other than the mapping between the XSD and the Excel worksheets. A tutorial on this wiki describes how such a workbook can be created.<br>Where<br>EV_TEMPLATE: The macro-enabled |

TABLE 1-continued

| ID | Function Signature | Description |
|---|---|---|
| | | Excel sheet that is the template corresponding to this adapter's metadata |
| | | ET_BAPIRET: Standard table of BAPIRET messages, returning error and warning information |

As stated above, in some embodiments, an adapter is used to implement one or more of the API's defined by the CLM system.

Figure 9:
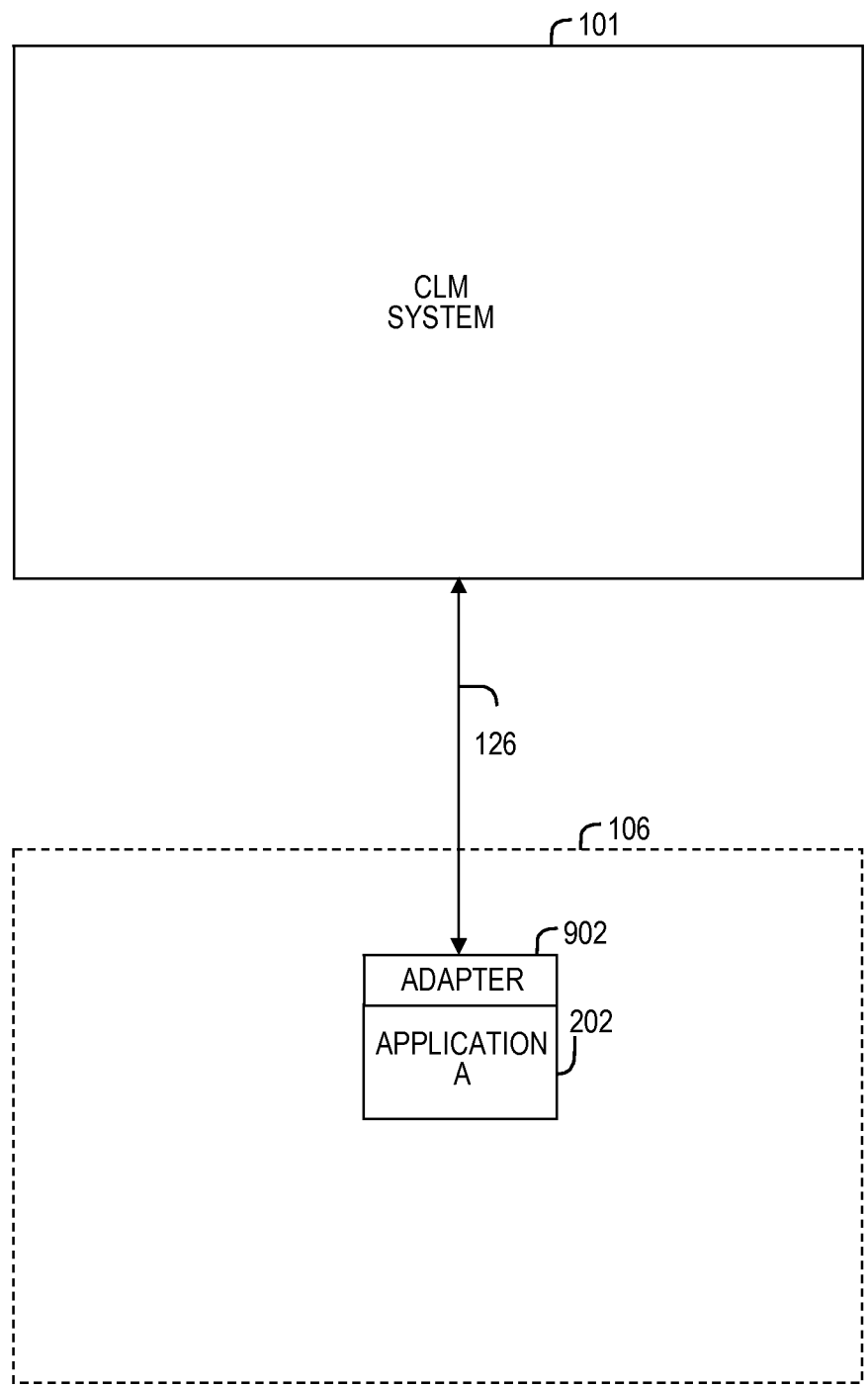
FIG. 9 is a block diagram of an interface configuration that makes use of an adapter, in accordance with some embodiments.

FIG. 9 is a block diagram of an interface configuration that makes use of an adapter, in accordance with some embodiments.

Referring to FIG. 9, in accordance with some embodiments, an adapter 902, sometimes referred to as a CLM adapter, may be provided between an application, e.g., the application 302 of processing system 106, and the CLM system. The adapter 902 may implement one or more portions of an API defined by the CLM system, as may be required, in order to allow for exchange of information between the application and the CLM system. In some embodiments, the adapter 902 is only a thin layer adapting the CLM API to the needs of the application.

The CLM system may consider the adapter 902 to be part of the application and may otherwise be independent of the applications and unaware of how the applications are implemented. As further described herein, in some embodiments, the adapter 902 may need to support a particular configuration and/or it may need to return information to indicate the CLM behaviors it supports. For example, as further described herein, if chunking of content is supported, the size of the chunks may be negotiated based on a minimum amount that the adapter can handle and a minimum amount that the CLM system can itself handle.

An adapter is not limited to an adapter 902 between the application 302 and the CLM system. In some embodiments, an adapter (e.g., which may be similar to the adapter 902 in one or more respects) may be provided between the CLM system 101 and any other application that is to exchange of information with the CLM system. Such adapter may implement one or more portions of an API defined by the CLM system, as may be required, in order to allow for exchange of information between the CLM system and such any application.

Figure 10:
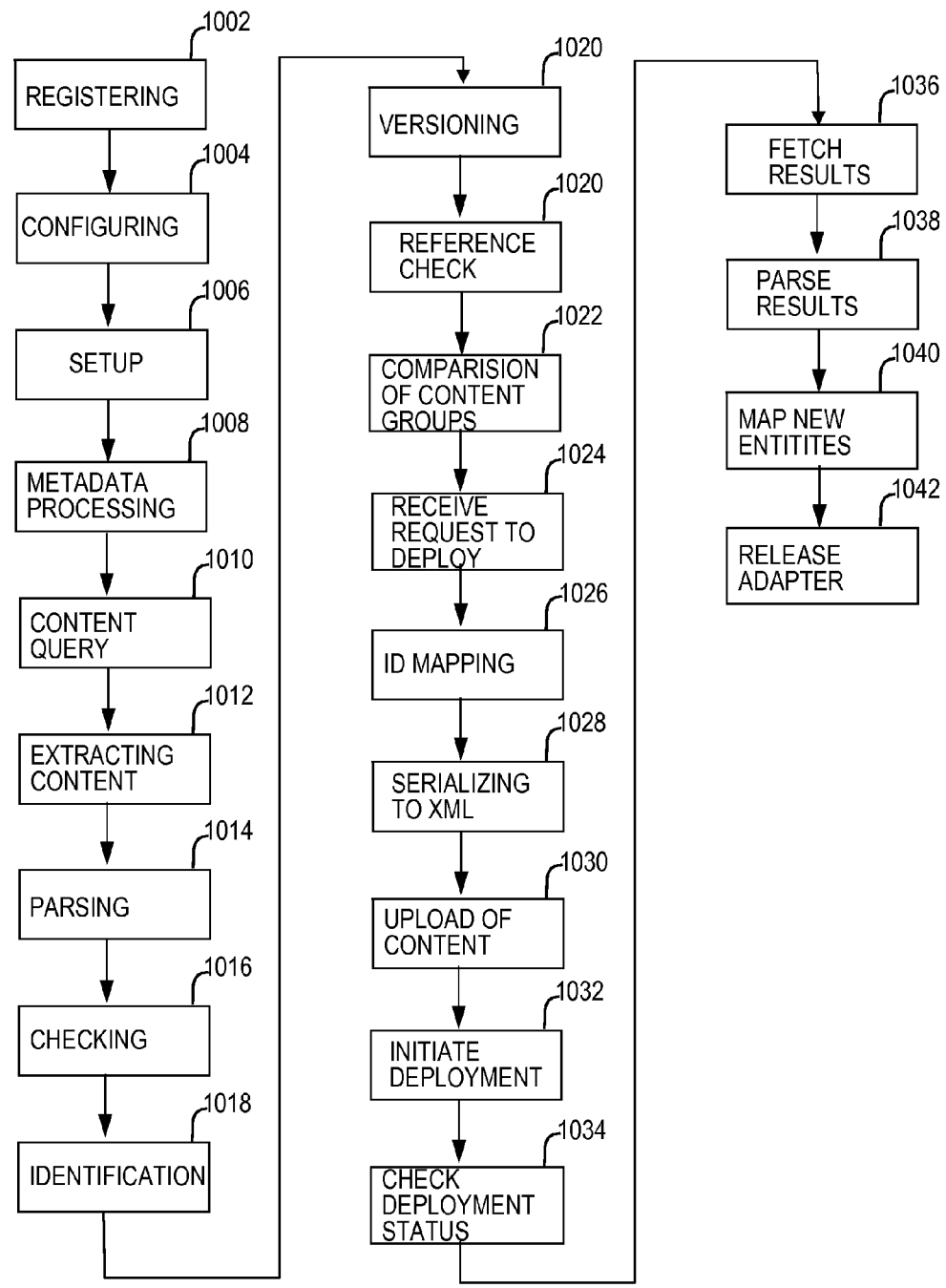
FIG. 10 is a flow chart of operations in a method, in accordance with some embodiments.

FIG. 10 is a flow chart of operations in a method, in accordance with some embodiments. In some embodiments, one or more portions of the method are performed by the CLM system 101. In some embodiments, one or more portions of the method are used in performing and/or in association with one or more portions of the method of FIG. 5.

Referring to FIG. 10, in accordance with some embodiments, at 1002, the method may include registering one or more applications with the CLM system 101.

In some embodiments, such registering may comprise storing information in a registry in the CLM system 101, which may include (e.g., store) information identifying applications that are registered with the CLM system 101. The registry may further include information identifying functions that implement the CLM API's for each of such applications. Thus, the registry may be used in determining how to access a logical unit with which the CLM system can exchange information.

In some embodiments, the registry comprises a table having a plurality of rows or line entries, e.g., where each of such rows or line entries is associated with an application registered with the CLM system 101 system and with which the CLM system 101 can interact.

Table 2 shows a portion of a registry that includes information for registration of various applications, in accordance with some embodiments.

TABLE 2

| Name | Application | Location | Client |
|---|---|---|---|
| System A | GRC RM | 192.168.0.21 | 200 |
| System B | GRC RM | 192.168.0.21 | 300 |
| System C | GRC PC | 192.168.0.21 | 200 |
| System D | GRC RM | 10.10.0.126 | 100 |

Based on the information in Table 2, it can be seen that, in some embodiments, an application named GRC RM runs on System A, System B and System D. An application named GRC PC runs on System C. A machine (which may be one of the processing systems 102-112) at location 192.168.0.21 runs two of the versions of the application named GRC RM, which are separated somehow by the machine. The machine at location 192.168.0.21 also runs the application named GRC PC. A machine at location 10.10.0.126 runs the other version of the application named GRC RM.

In some embodiments, the information that is included in the registry 512 is supplied via an administrative user interface (not shown), which may be provided by the CLM system 101 to allow an administrator to supply such information.

In some embodiments, a provider of CLM systems may test a CLM system with various applications and may store information in the registry, prior to shipping the CLM, regarding the configuration of the applications that have been tested with the CLM system.

At 1004, the method may further include configuring information about the applications that are registered with the CLM system 101 (and with which the CLM system 101 can interact). This information, sometimes referred to herein as configuration information, may include information about the functions that implement one or more portions of the CLM API for such applications, and in turn, provide metadata associated with such applications. In some embodiments, the configuration information is stored in a table, sometimes referred to herein as a configuration table.

Table 3 shows a portion of a configuration table, in accordance with some embodiments.

TABLE 3

| Application Name | CLM API | Implementing method |
|---|---|---|
| GRC RM | setup | grrm_clm_setup |
| | get_adapter_info | grrm_clm_adapter_info |

TABLE 3-continued

| Application Name | CLM API | Implementing method |
|---|---|---|
| | get_metadata | grrm_clm_get_metadata |
| | ... | ... |
| GRC PC | setup | grpc_clm_init |
| | get_adapter_info | grpc_clm_adapter_info |
| | get_metadata | grpc_clm_get_xsd |
| | ... | ... |

Based on the information in Table 3, it can be seen that an application named GRC RM implements the CLM "setup" API using a method named grrm_clm_setup.

In some embodiments, neither the metadata nor the set of functions associated with an application is intended to vary over the life of the CLM system. Therefore whenever content is identified as belonging to a particular application, the content can be extracted and deployed using the same set of functions and with the same structure (as described by the various metadata and schema).

At 1006, the method may further include performing a setup, which may include obtaining application metadata that describes some or all content that is exposed by an application via the CLM API. In some embodiments, the metadata may be in an XSD format.

At 1008, the method may further include metadata processing (e.g., by parsing metadata in an XSD format) to determine some or all of the following: a namespace for the content, types of content records available, relationships and dependencies between content records, a cardinality of content records and an order of content records.

In some embodiments, the metadata must be consistent across Landscapes and processing systems within a Landscape. In such embodiments, the CLM system may store the metadata by the namespace reported by the metadata itself. If an application returns inconsistent metadata for this namespace it is considered an error. A revised version of the metadata requires a new namespace (which might only differ by an embedded version number). In some embodiments, all content is qualified by and associated with the namespace after it has been received by the CLM system. Some embodiments for doing so are further described below.

Table 4 shows a listing for a portion of a content group, in accordance with some embodiments. In accordance with some embodiments, the portion of the content group includes two content records, content record A and content record B. Each content record provides information regarding the animal kingdom. More particularly, content record A describes two types of body coverings, i.e., short fur and short hair. Content record B describes 3 types of animals, i.e., cats, dogs and wolf. The reference field in content record B links to the body coverings in content record type A, in order to link each type of animal to its type of body covering.

TABLE 4

```
<CONTENT>
    <A ID="A/1001">
        <F1>Fur</F1>
        <F2>Short</F2>
    </A>
    <A ID="A/1002">
        <F1>Hair</F1>
        <F2>Short</F2>
    </A>
    <B ID="B/1001">
        <FA>Cats</FA>
        <FB>Felis Catus</FB>
        <FC>Domestic</FC>
```

TABLE 4-continued

```
        <F_REF_TO_A>A/1001</F_REF_TO_A>
    </B>
    <B ID="B/1002">
        <FA>Dogs</FA>
        <FB>Canis Lupus Familiaris</FB>
        <FC>Domestic</FC>
        <F_REF_TO_A>A/1002</F_REF_TO_A>
    </B>
    <B ID="B/1003">
        <FA>Wolf</FA>
        <FB>Canis Lupus</FB>
        <FC>Feral</FC>
        <F_REF_TO_A>A/1002</F_REF_TO_A>
    </B>
</CONTENT>
```

In some embodiments, the metadata identifies relationships between entities (e.g., content records) as XSD Keys and KeyRefs (or by using some other convention). Consequently, following the parse of the metadata, the CLM system knows the fields within an entity that are reference fields.

Figure 11:
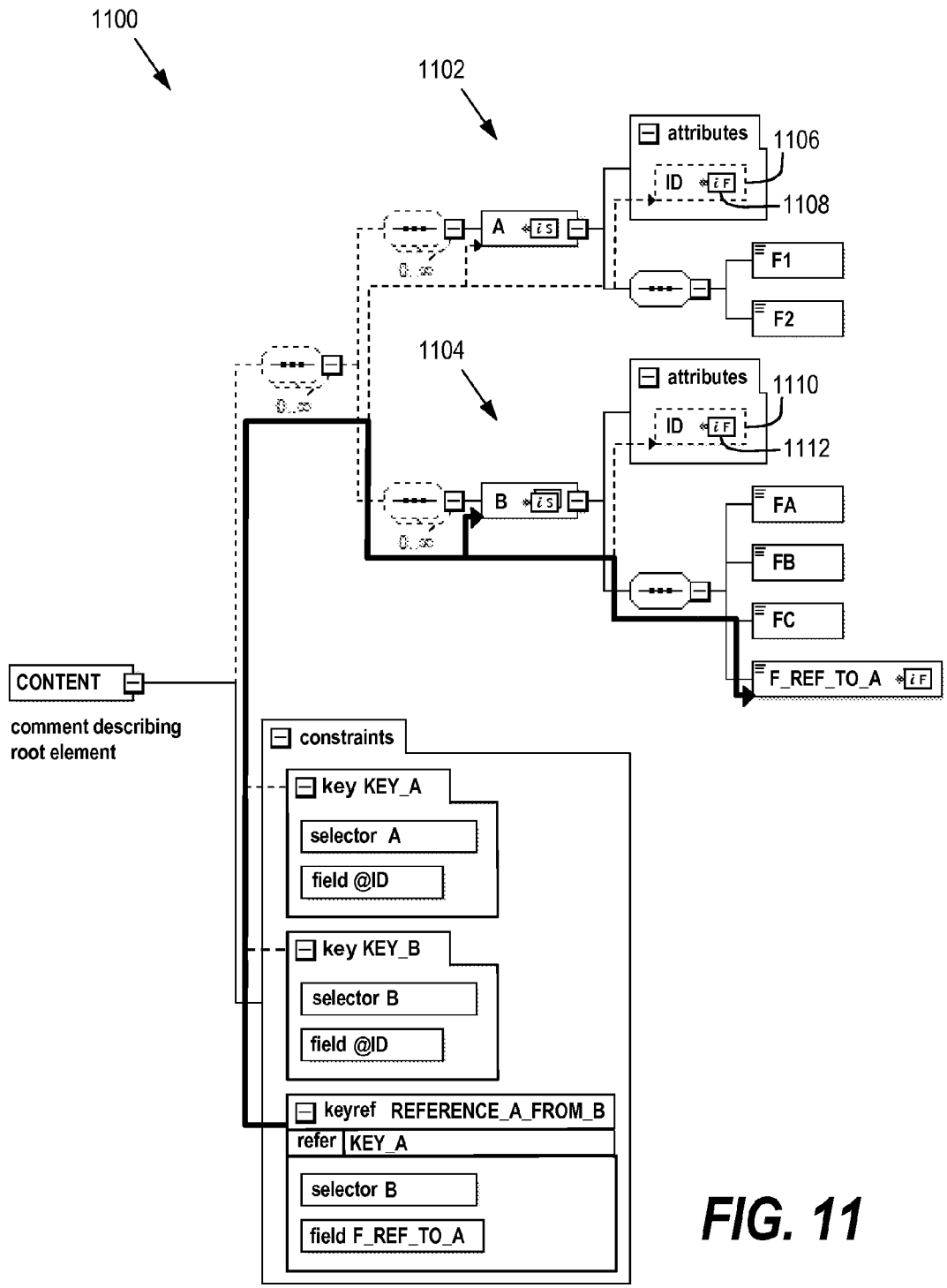
FIG. 11 is a hierarchical representation, in accordance with some embodiments.

FIG. 11 is a hierarchical representation 1100 of the portion of the content group listed in Table 4, in combination with metadata that may be provided in association with the content group, in accordance with some embodiments.

Referring to FIG. 11, in accordance with some embodiments, the representation defines two content records, i.e., content record A 1102 and content record B 1104. Each of the content records has an attribute ID that holds the content record ID (either a local ID or a CLM ID). For example, in the representation 1100, the content record A has an attribute ID 1106 that holds the content record ID 1108 for content record A. The content record B has an attribute ID 1110 that holds the content record ID 1112 for content record B. In some embodiments, local IDs for content records must be unique within the XML document and must be returned consistently for each and every extract of the content from a given application instance.

Each content record may also have a Key by which the content record can be referenced. The Keys refer to a content record's position within the document (its path) and its ID. Content record A thus has a Key, i.e., Key_A, that refers to content record A's position within the document (its path), i.e., A, and its ID, i.e., @ID. In the representation 1100, content record B has a Key, i.e., Key_B, that refers to content record B's position within the document (its path), i.e., B, and its ID, i.e., @ID.

The representation 1100 also shows a relation between content record A and content record B. A KeyRef, i.e., REFERENCE_A_FROM_B, holds a value of a Key_A from any of the KEY_As contained in the document. The KeyRef also refers to the position of a reference within the document (its path), i.e., B, and its name, i.e., F_REF_TO_A.

Figure 12:
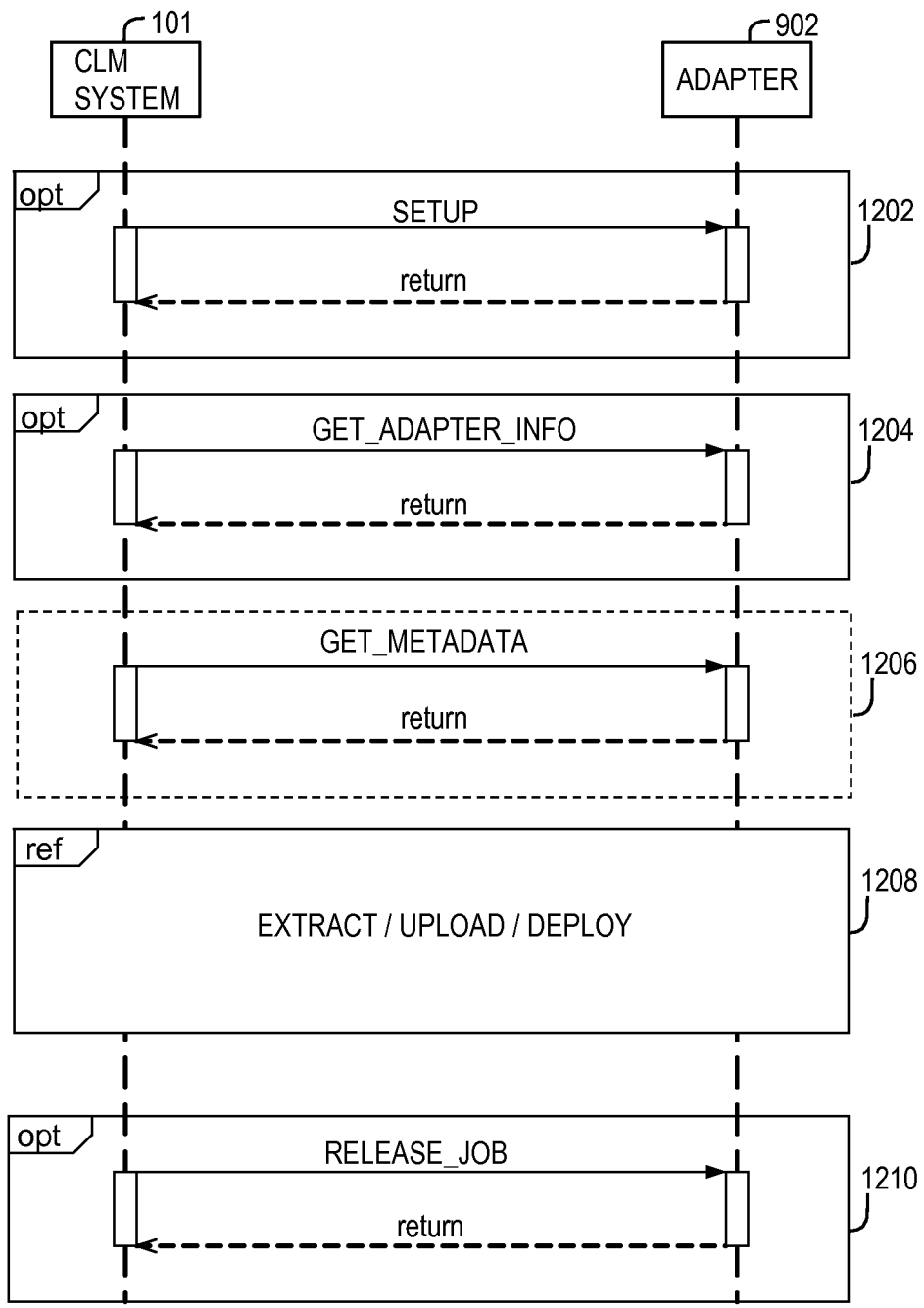
FIG. 12 is a block diagram showing a sequence of calls, in accordance with some embodiments.

FIG. 12 is a block diagram showing a sequence of calls that may be made by the CLM system 101 to the CLM API and the resulting control/data flow in association with the setup 1006 and metadata processing 1008, in accordance with some embodiments.

Referring to FIG. 12, in accordance with some embodiments, the sequence of calls may include a call to a setup method 1202, a call to a get_adapter_info method 1204, a call to a get metadata method 1206, one or more calls to extract, upload and/or deploy methods 1208 and a call to a release job method 1210.

The call to the setup method 1202, the call to a get_adapter_info method 1204, and the call to the get metadata method 1206 may be made in performing the setup, and metadata processing functions, and in response, the application (or the adapter 902 of the application) may return information exposed by the setup method 1202, the get_adapter_info method 1204 and the get metadata method 1206, respectively.

The one or more calls to the extract, upload and/or deploy methods 1208 are further described below.

Thereafter call to the release job method 1210 may be made to release the job and any resource associated with the job, as further described below. Following invocation of this function, the application or adapter 902 of the application may not be expected to track the job status anymore.

Referring again to FIG. 10, at 1010, the method may further include a content query. For example, in some embodiments, an application supports querying or selective retrieval of content, and a content query function returns information needed to form such queries as XML. The process of forming a query may be application-specific and may involve passing query information to an application-specific component or user interface that is used to form a query. As a result, the CLM system may not interpret or process the query information directly. In some embodiments, no XSD is provided by the CLM system for the EV_CONTENT parameter by CLM. In some embodiments, the CLM system may optionally embed an application specific component to render the query information, allow the user to make a selection of that information and format a query string that can then be returned to the application during the content extraction and deployment processes.

Figure 13:
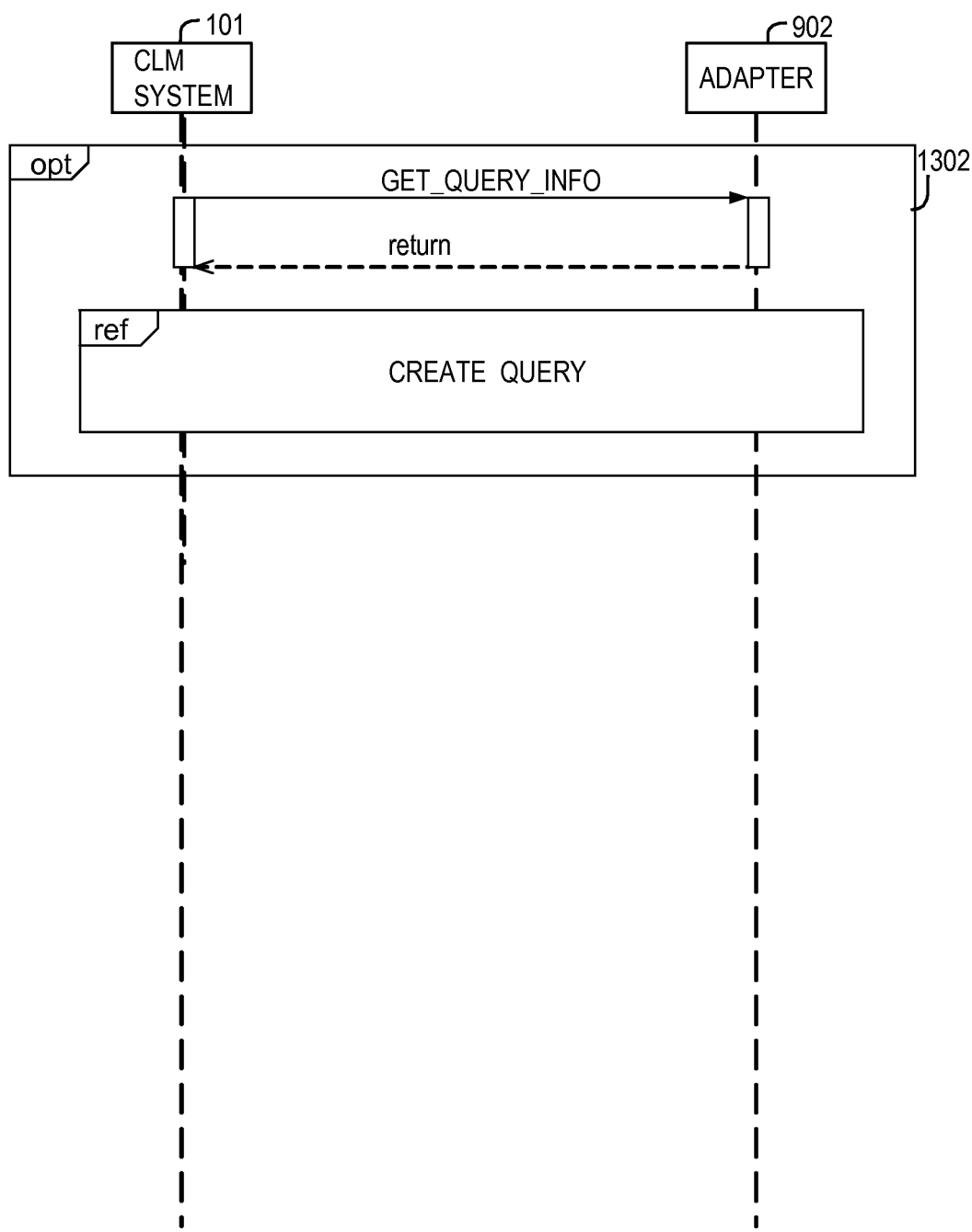
FIG. 13 is a block diagram showing a call, in accordance with some embodiments.

FIG. 13 is a block diagram showing a call that may be made by the CLM system 101 to the CLM API and the resulting control/data flow in association with the content query 1010, in accordance with some embodiments.

Referring to FIG. 13, in accordance with some embodiments, the call may include a call to a get_query_info method 1302.

Referring again to FIG. 10, at 1012, the method may further include extracting content. In some embodiments, this may be performed by calling a function defined by the CLM API (e.g., extract_content) to extract the content. After the content is extracted, the extracted content may be serialized as XML complying to an XML format described by the metadata of the application from which the content is extracted.

The volume of content to be extracted may vary according to the application and the processing system. In some cases, a single CLM function call (e.g., extract_content) may be used to extract all of the content. However, in some other cases the volume of content to be extracted may exceed what can be returned to the CLM system by a CLM function call. To accommodate such cases, the CLM system may support chunking of content, such that the content may be extracted in blocks (i.e., portions) sometimes referred to herein as chunks. If chunking is supported, one block of the content may be returned in response to each function call (e.g., extract_content). The size of the block may be in accordance with parameters exchanged during a setup of the adapter 902 (e.g., min and max chunk sizes). The extract portion 508 may repeatedly call the function defined by the CLM API (e.g., extract_content) until all of the content has been extracted. An application may indicate that it has sent all content to be extracted by setting a flag (e.g., a has_more flag) to false. The chunks may not be considered valid in and of themselves. Thus, content that is received as chunks may not be processed until all chunks have been received and the chunks have been reassembled.

As described above, in some embodiments, a user begins the extract process by clicking an Extract button in a user interface. On Extract the CLM system may then allow the user to select one of the target system and application combinations that they have registered. The CLM system may then extract the content from the specific application. The subset of content exposed by the application may be controlled by the application and returned to the CLM system via XML. The application may also return metadata that describes the content.

As further described below, the CLM system may then parse the XML and store the content in its database. In some embodiments, the content is read-only and the CLM system does not allow editing of the content within an individual content group. The extracted content group may tagged by user, date/time, system, application and status.

Figure 14:
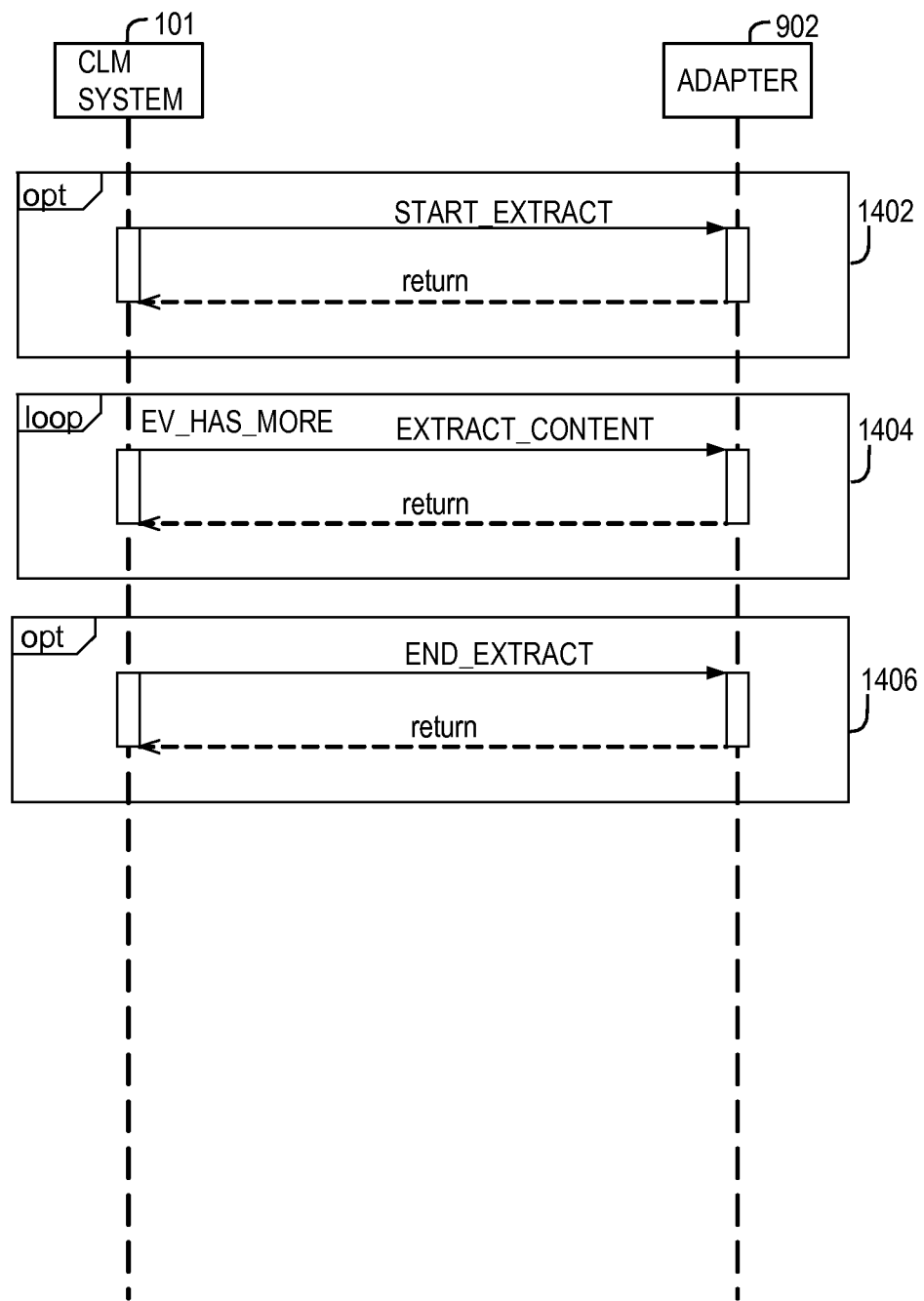
FIG. 14 is a block diagram showing a sequence of calls, in accordance with some embodiments.

FIG. 14 is a block diagram showing a sequence of calls that may be made by the CLM system 101 to the CLM API and the resulting control/data flow in association with the extracting of content, in accordance with some embodiments.

Referring to FIG. 14, in accordance with some embodiments, the sequence of calls may include a call to a start_extract method 1402, one or more calls to an extract_content method 1404, a call to end_extract method 1406.

Referring again to FIG. 10, at 1014, the method may further include parsing the extracted content. In some embodiments, parsing splits the content group into content records.

Information about success and/or failure of the parse may be logged and the state of the content group may be updated based on such results.

If a parse is not able to successfully parse 100% of the content group, the content group may be treated as bad. In some embodiments, if a content group is bad, it cannot be deployed or packaged for export by CLM.

In some embodiments, the CLM system may parse in a top to bottom order in the XML document, depth first.

In some embodiments, all references or relations must be backward references, that is, no reference may be to a content record that has not yet been parsed by the CLM system.

At 1016, and after parsing, each of the content records may be checked against the metadata provided by the application and/or for structural integrity, i.e., that the required fields are present and in the correct numbers. If a content record fails the check, the content record may be deemed bad. If a content record is deemed bad, the entire content group may also be deemed bad, although in some embodiments, processing may continue.

Each of the content records may be stored in a database, sometimes referred to herein as a CLM database or CLM repository. In some embodiments, storing is performed prior to checking the content records. In some other embodiments, the storing is performed after checking the content records.

At 1016, the method may further include identification. Initially, each content record may be stored in association with the associated ID provided in the extracted XML. However, as described above, if the ID provided is not a CLM managed ID, the CLM system may generate a CLM Managed ID for the content record.

Each field that is a reference or relation to another content record (thereby containing a content record ID) may also be updated with the CLM ID instead of the Local ID.

As described above, the CLM system may maintain a map (e.g., a mapping table) of Local IDs to CLM IDs for each system registered with CLM. Thus, prior to generating a CLM ID, the CLM system determines whether a CLM identifier has already been generated for the local ID. If the Local ID is found in the mapping for the source system (i.e., a CLM ID has already been generated for the local ID in the source system), then the CLM ID already generated for the local ID will be used (i.e., the local ID in the extracted content will be replaced by the CLM ID associated with the local ID). If the local ID is not found in the mapping (i.e., a CLM ID has not already been generated for the local ID in the source system), then a new CLM ID is generated and a mapping between the local ID and the CLM ID is added to the mapping of Local IDs to CLM IDs for that system.

At 1020, the method may further include versioning. If it is determined that a CLM ID has already been generated for the local ID, then a version of the content record and its local ID have appeared in a previous extraction (and may still be stored in the CLM system) and the version of the content record in the current extraction may be treated as an update to the content in the previous extraction.

In some embodiments, the version of the content record in the current extraction is compared to the version of the content record in the previous extraction.

In some embodiments, this comparison is performed by determining a cryptographic hash (e.g. an MD5 hash) for the content record in the current extraction. The hash of the content record may then be compared to a similar type of hash determined for the corresponding content record (i.e., the content with the same ID) in the previous extraction. If there are multiple previous versions of the content record (i.e., from multiple extractions), the hash of the content record in the current extraction may be compared to multiple hashes, each being associated with a respective one of the multiple previous versions of the content record. In some embodiments, the comparison is performed after all local ID's in the content group have been replaced by the CLM ID's mapped thereto.

If a match is found then, the matching previous version is referenced and/or otherwise indicated as being part of the content group in the current extraction.

If a match is not found then the new version of the content record is stored, versioned and persisted to the CLM database. In some embodiments, the new version of the content record is versioned by based at least in part on a timestamp and/or a monotonically increasing counter.

At 1020, the method may further include reference checking. In some embodiments, after the content group has been parsed, the content records are checked to ensure that the relations are all resolved, that is that the content group contains all the content records that are referenced within the content group.

In some embodiments, all the references between content records must be resolved within a single content group. Without this constraint, the CLM system would have to maintain dependencies between content groups in order to ensure referential integrity.

If a reference is not resolved, the content record that includes that reference is treated as a bad. In some embodiments, the rest of the content group (i.e., the content group that includes the bad content record) may also be treated as bad.

In some embodiments, if a content group is bad then it cannot be deployed or packaged for export by CLM the system.

At 1022, the method may further include comparing content groups with compatible content groups, i.e., content groups that have the XML namespace.

In some embodiments, the CLM system may compare content groups by iterating over the content records and comparing content records one by one. If an existing content record is different than a recently extracted content record, it is marked as an Update. If the source (i.e., the previously extracted content group) for a comparison does not include a content record that appears in the target of the comparison (i.e., the most recently extracted content group) then the content record is marked as an Addition. If the target for the comparison does not include a content record that is included in the source, then the content record is marked as a Deletion.

The results of a comparison of content groups can be saved as a content group. A comparison content group is a union of the source and target content groups plus the comparison status for each content record.

A comparison content group can be deployed to an application instance (deployment target).

In some embodiments, the CLM system provides a user interface that indicates (for a user) any differences that were identified through the comparison process. The user interface allows the user accept or reject the changes. Rejection of a change means that a content record newly marked as an addition will not be added to the deployment target, a content record newly marked as a deletion will not be deleted on the deployment target, or that a particular change will not occur on the deployment target.

For purposes of referential integrity, even rejected changes are included in a comparison content group.

In some embodiments, the user interface of the CLM system includes a facility (e.g., a view or set of views in the user interface) to see the relations between content records as a 'where used' list.

In some embodiments, the CLM system includes sufficient information to traverse relationships and prevent changes that might compromise referential integrity. Therefore, during deployment of a change, the CLM system can modify the comparison status so that an application is given a valid content group. In some embodiments, a comparison that indicates that an entity is a new content record will be sent as a changed content record if that content record already exists on a deployment target. Similarly, if an addition has been rejected and some other content record references the rejected content record then the rejected content record can still be sent to the deployment target as a new content record.

At 1024, the method may further include receiving a request to deploy content to a selected processing system. In some embodiments, the deployment process can begin after the CLM user has selected the target system to which content is to be deployed.

In some embodiments, a user can select a content group for deployment by choosing it from a list and selecting the Deploy option in a user interface. The user may then choose the target or destination system for the content. In some embodiments, the CLM system provides a user interface that offers a list of compatible system/application registrations from which a user can choose a target system. After a user chooses a target system, the CLM system may send the content to the target system for deployment.

As further described below, in some embodiments, there are several steps involved in deploying content. In some embodiments, the first step is to serialize content to XML. The next step may be to upload the content to the target system. The third step may be to deploy the content. After the content is deployed, the CLM system may check for errors.

At 1026, the method may further include ID mapping. In some embodiments, as content records are serialized, the CLM system checks its ID mapping (for the processing system to which the content is to be deployed) to determine if there is a Local ID for either the content records or any of their relations.

In some embodiments, if a mapping is found then the Local ID is used in place of the CLM ID and it is assumed that the deployment target already has a copy of the content record. If a content record had been deleted from the target system, then it would have shown up as a deletion when the content group was compared.

In some embodiments, the CLM system also checks that the basis of the comparison still corresponds to the basis on which the comparison content group was calculated. Such a check can be carried out by comparing content groups or by comparing the extraction dates for the content groups.

At 1028, the method may further include serializing content to XML. In some embodiments, in order to deploy a content group, the content group must first be serialized to XML in order to prepare it for upload to the deployment target. In some embodiments, this comprises a serialization process that combines the content with the comparison information for content groups that underwent comparison.

At 1030, the method may further include uploading of content. As with extraction, in some embodiments, the upload process may split the content into blocks or chunks. Again, the chunks are not intended to be consumed and instead they are assembled on the target system to reproduce the complete XML document for the content group being deployed.

In some embodiments, a content group need not be deployed immediately. Several attempts might also be made to deploy a content group, and therefore an application Adapter may choose to hold on to an uploaded content group for an extended period.

Depending on the configuration information exchanged between the application and the CLM system upon handshaking, the CLM system either uploads the content in one chunk or in multiple chunks. If more content is being sent in a chunking scenario, then the more_content flag is true and the application should expect more data.

In some embodiments, a job ID is provided to identify the uploaded content.

Figure 15:
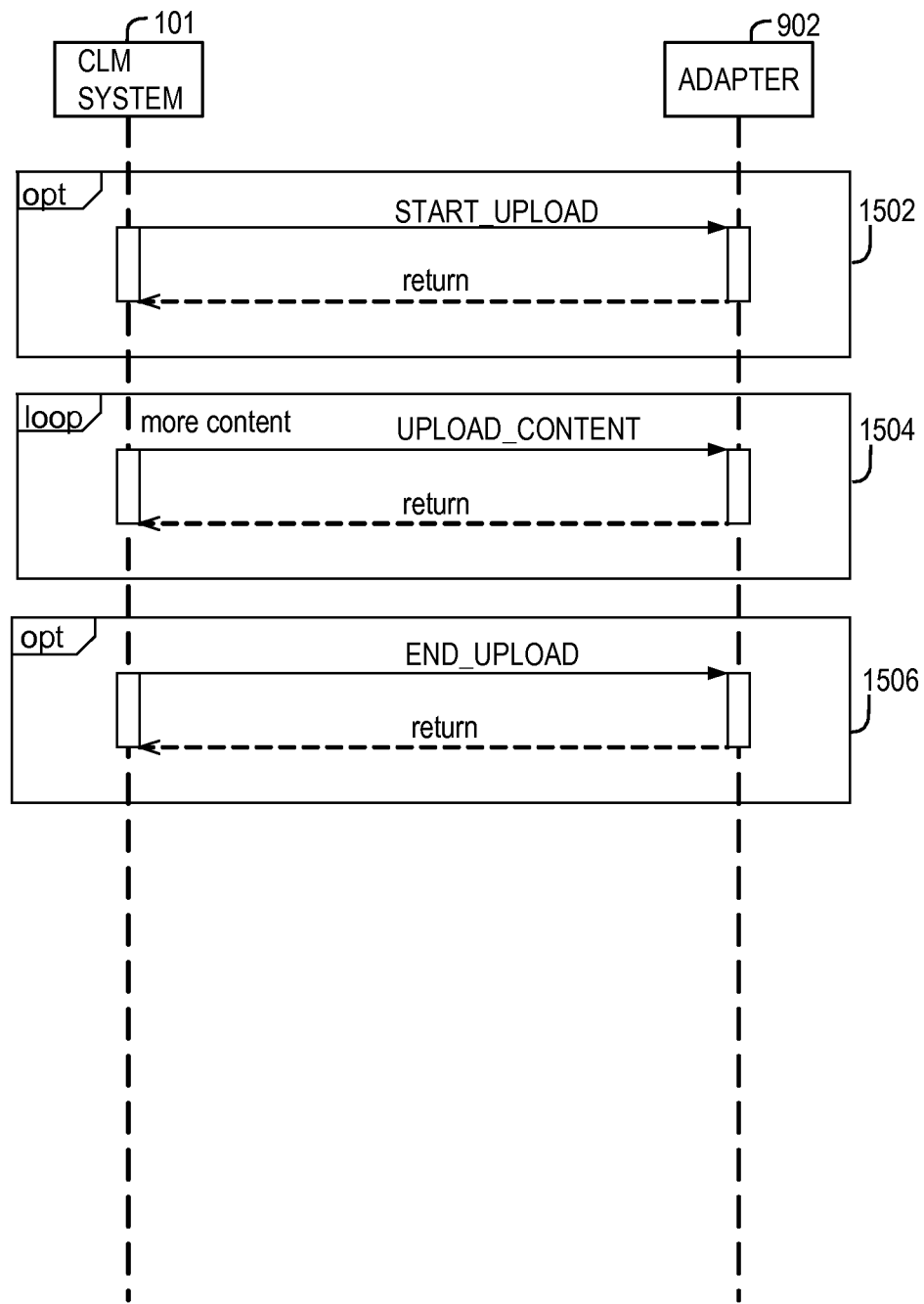
FIG. 15 is a block diagram showing a sequence of calls, in accordance with some embodiments.

FIG. 15 is a block diagram showing a sequence of calls that may be made by the CLM system 101 to the CLM API and the resulting control/data flow in association with the uploading of content, in accordance with some embodiments.

Referring to FIG. 15, in accordance with some embodiments, the sequence of calls may include a call to a start_upload method 102, one or more calls to an upload_content method 1504, a call to end_upload method 1506.

Referring again to FIG. 10, at 1032, the method may further include initiating deployment. In some embodiments, the deployment is initiated after the content has been completely uploaded. In such embodiments, the deployment may be initiated by calling the deploy_content API and the deploy_content function is a signal to deploy content.

In some embodiments, the deployment process operates on the content indicated by the job_id.

The deployment may be asynchronous or synchronous. In some embodiments, if the deployment is asynchronous, the function (the deploy_content function) returns immediately and the CLM system then polls for completion of the deployment.

At 1034, the method may further include checking the deployment status. In some embodiments, following deployment initiation the CLM system calls the adapter's get_status method to check the deployment job status.

At 1036, the method may further include fetching results. If the job completes successfully, the CLM system may then call the adapter's get_results method, which returns the following: deployment job status results, the ID mapping for NEW content records and any error or warning messages.

The deployment job status results may indicate that the deployment failed (the deployment job may have completed successfully without successfully deploying the content. For example, in some embodiments, the content can be progressively uploaded by sending it in pieces or fragments. An application needs a flag to indicate that the last piece is being sent to know that the upload is complete. Otherwise it would have to remain open, waiting for further pieces. For example even if all steps and processes in the deployment job are executed successfully the content may not be deployed if the third processing system 106 detects any problems or conflicts with the new content—such as a value being out of range).

In some embodiments, the deployment results are returned as XML.

At 1038, the method may further include parsing results. In some embodiments the XML is parsed and results are prepared for further processing. Any Content Record Identifiers are resolved to CLM IDs.

At 1040, the method may further include mapping of new entities. In some embodiments the ID mapping for NEW content records is a mapping that indicates the new Local ID for any new content records that were deployed. The new content records were sent with a CLM ID and the results therefore indicates the Local ID that corresponds to the CLM ID that had been sent in the uploaded content. The error or warning messages may use CLM or Local IDs for new Entities or Local IDs for existing content records that are being modified by the deployment.

At 1042, the method may further include releasing the adapter. In some embodiments, the release_job method tells the Adapter that the CLM system will no longer request operations on the uploaded content, and it can then be deleted.

Some embodiments may allow content to be moved from one landscape, e.g., landscape 100, to another landscape.

Figure 16:
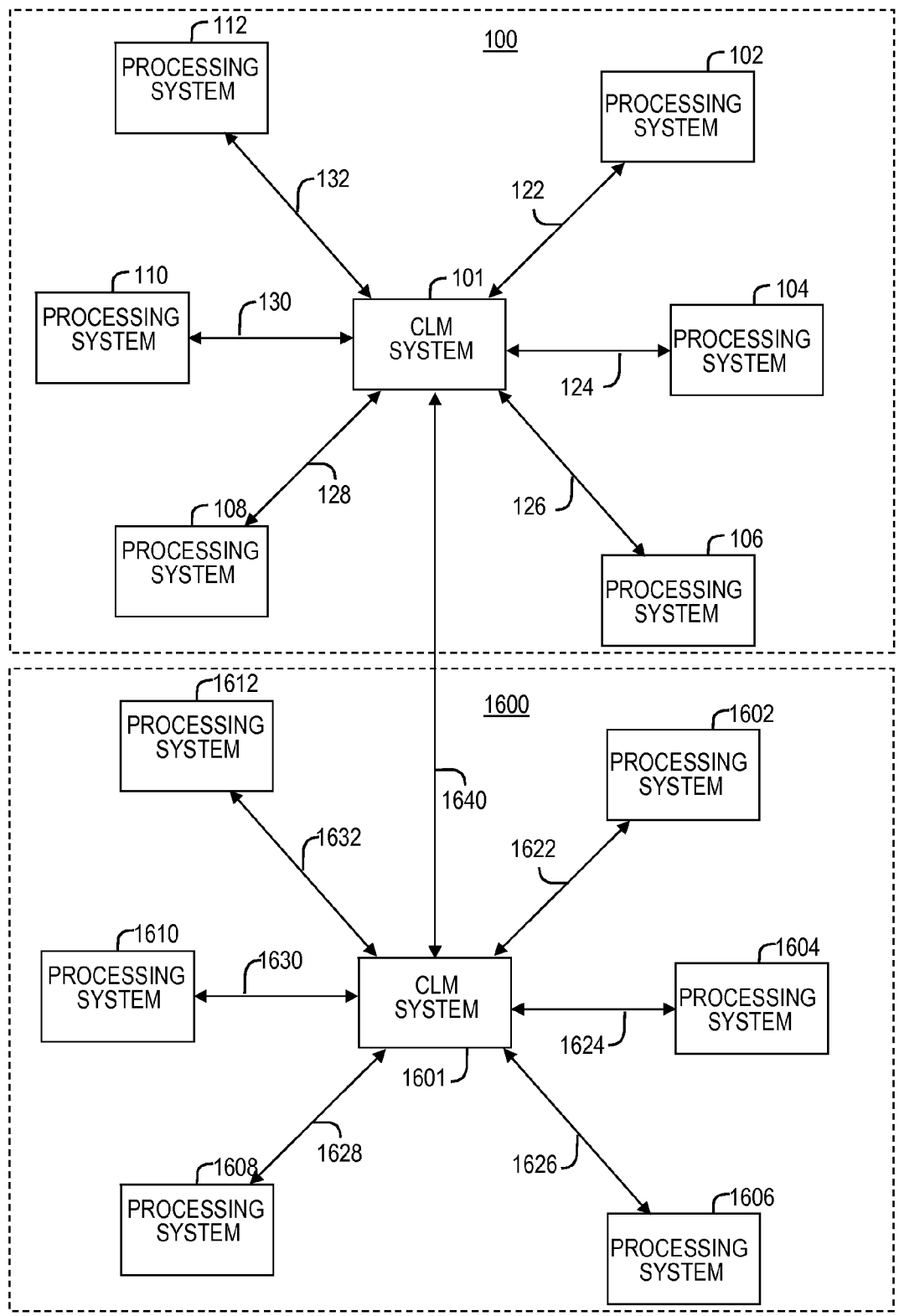
FIGS. 16-17 are block diagrams showing systems, in accordance with some embodiments.
Figure 17:
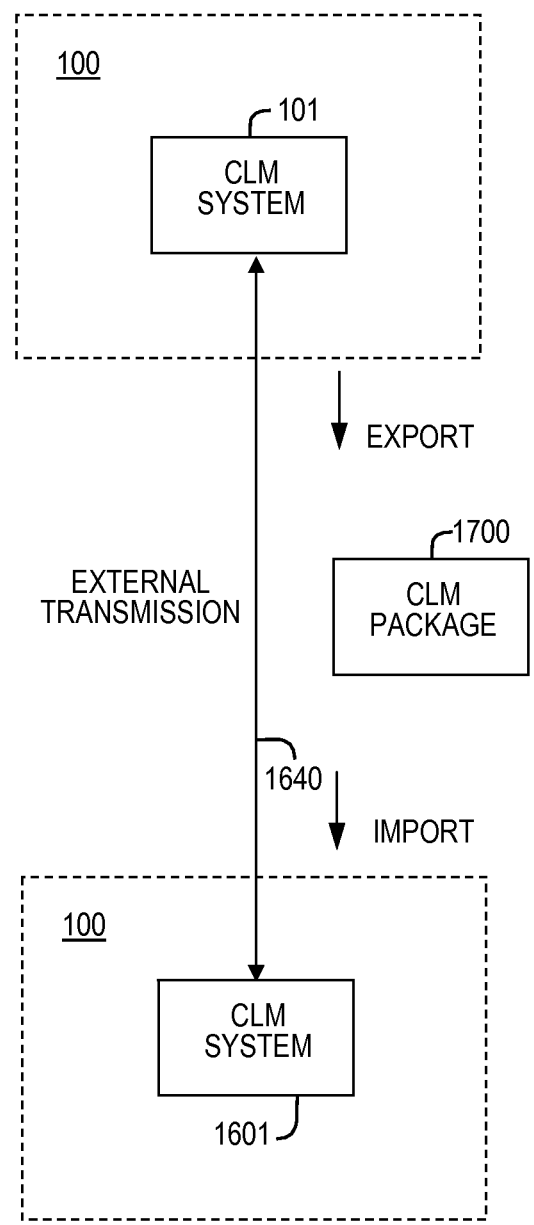

FIGS. 16-17 are block diagrams showing the system or landscape 100 and a second system 1600, sometimes referred to herein as a second landscape 1600, in accordance with some embodiments.

Referring to FIG. 16, in accordance with some embodiments, the second system or landscape 1600 may include a second plurality of processing systems 1601-1612 and a second plurality of communication links 1622-1632. A first one of the second plurality of processing systems, i.e., processing system 1601, may comprise a second CLM system and is sometimes referred to herein as CLM system 1601. The second plurality of communication links 1622-1632 may couple the second plurality of processing systems 1602-1612 to the second CLM system 1601.

In some embodiments, the CLM system 1601 and the plurality of processing systems 1602-1612 are similar to the CLM system 101 and the plurality of processing systems 102-112, respectively. A communication link 1640, which may comprise a mechanism external to the system 100 and system 1600, may enable content to be passed between the CLM system 101 and the second CLM system 1601.

The CLM system 101 and the CLM system 1614 may allow content to be moved from the system or landscape 100 to the second system or landscape 1600 and/or from the second landscape 1600 to the landscape 100.

Referring to FIG. 17, in some embodiments, the CLM system 101 packages content 1700 that is to be moved from the system or landscape 100 to the system or landscape 1600. The packaged content 1700 may be exported from the CLM system 101 in the landscape 100 and imported into the CLM system 1001 in the second landscape 1600.

In some embodiments, a CLM package may comprise a ZIP file containing one or more content groups serialized as XML, plus some metadata that describes the content of the package. The packaged content 1700 may further include one or more attachments, i.e., files that are added to the package, for example PDF documentation. In some embodiments, the attachments may not be linked in any way to other content in the package by any CLM enforced mechanism.

In some embodiments, a content record cannot appear in more than one version within a Package. Therefore, if more than one content group refers or includes a content record, then all content groups that refer or include the content record must refer or include the same version of that content record.

Figure 18:
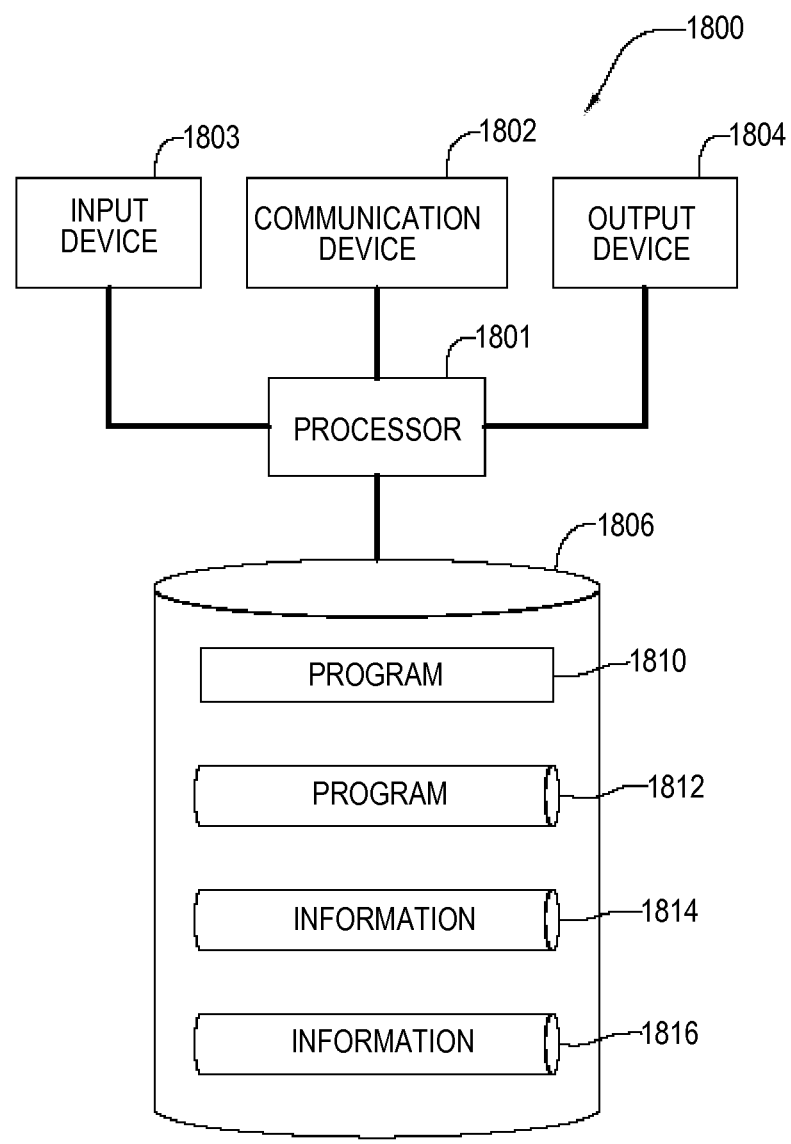
FIG. 18 is a block diagram of an architecture, in accordance with some embodiments.

FIG. 18 is a block diagram of an architecture 1800 according to some embodiments. In some embodiments, one or more of the systems or processing systems (or portion(s) thereof) disclosed herein, and/or one or more apparatus (or portion(s) thereof) disclosed herein may have an architecture that is the same as and/or similar to the architecture 1800 (or portion(s) thereof). In some embodiments, one or more of the methods (or portion(s) thereof) disclosed herein may be performed by systems, apparatus and/or devices having an architecture that is the same as and/or similar to the architecture 1800 (or portion(s) thereof).

Referring to FIG. 18, in accordance with some embodiments, the architecture 1800 includes a processor 1801 coupled to a communication device 1802, an input device 1803, an output device 1804 and a storage device 1806.

In some embodiments, the processor 1801 may execute processor-executable program code to provide or otherwise result in one or more portions of one or more functions and/or one or more portions of one or more methods disclosed herein. In some embodiments, the processor 1801 may comprise one or more INTEL® Pentium® processors.

The communication device 1802 may be used to facilitate communication with other devices and/or systems. In some embodiments, communication device 1802 may comprise an Ethernet and/or other type of connection to a network and/or resource and through which architecture 1800 may receive and/or transmit information.

The input device 1803 may be used to input information. In some embodiments, the input device 1803 may comprise a keyboard, a keypad, a track ball, a touchpad, a mouse or other pointing device, a microphone, a knob or a switch, an infrared (IR) port and/or a computer media reader.

The output device 1804 may be used to output information. In some embodiments, the output device 1804 may comprise an IR port, a docking station, a display, a speaker and/or a printer.

The storage device 1806 may store one or more programs 1810-1812 and/or other information for operation of the architecture 1800. In some embodiments, the one or more programs and/or other information may include one or more operating systems, one or more database management systems and/or other applications for operation of the architecture 1800. In some embodiments, the one or more programs 1810-1812 may include one or more instructions to be executed by the processor 1801 to provide one or more portions of one or more functions and/or one or more portions of one or more methods disclosed herein. In some embodiments, the one or more programs and/or other information may include one or more databases 1814-1816.

In some embodiments, the storage device 906 may comprise one or more storage devices, such as, for example, magnetic storage devices (e.g., magnetic tape and/or hard disk drives), optical storage devices, and/or semiconductor memory devices such as Random Access Memory (RAM) devices and Read Only Memory (ROM) devices.

In some embodiments, one or more portions of one or more embodiments disclosed herein may be embodied in a system, a method, an apparatus and/or a computer-readable storage medium. Some embodiments may employ one or more portions of any a system, a method, an apparatus and/or a computer-readable storage medium disclosed herein without one or more other portions of such a system, a method, an apparatus and/or a computer-readable storage medium.

In some embodiments, one or more (i.e., some or all) portions of any embodiment disclosed herein may be performed by a processor.

In some embodiments, one or more portions of any embodiment disclosed herein may result from a processor executing instructions.

In some embodiments, a computer-readable storage medium may store thereon instructions that when executed by a processor result in performance of one or more portions of one or more embodiments disclosed herein.

A computer-readable storage medium may store thereon instructions that when executed by a processor (or multiple processors) result in performance of a process according to any of the embodiments described herein.

In some embodiments, some or all portions of the information described in herein may be stored in one or more storage devices.

In some embodiments, a landscape comprises a collection or arrangement of connected computer systems.

In some embodiments, a processing system comprises an individual computer system (consisting of one or more logical processing units.

In some embodiments, a CLM repository comprise a central CLM application and storage.

In some embodiments, an application comprises a logical software component that is accessible on its own (and not as part of some other software component).

In some embodiments, a content group comprises a unit of content extraction or deployment.

In some embodiment, a content record comprises the lowest level of content that CLM can deploy manipulate.

In some embodiment, a field comprises a value within a content record.

In some embodiments, chunking comprises passing of a content group's XML serialization in successive blocks or subsection that when reassembled in the order in which they were sent match the complete original XML document.

In some embodiments, a local identifier (ID) comprises the ID used by an application instance to identify a content record.

In some embodiments, a CLM ID comprises an ID used by a CLM system to identify a content record. The ID is globally unique.

Unless stated otherwise, a mapping may have any form, for example, but not limited to, a look-up table, a rule base, hardwired logic, fuzzy logic, neural networks, and/or any combination thereof, and may be embodied in software, hardware, firmware or any combination thereof. In some embodiments, the mapping is generated manually, automatically or by a combination thereof.

Unless stated otherwise, terms such as, for example, "comprises", "has", "includes", and all forms thereof, are considered open-ended, so as not to preclude additional elements and/or features. In addition, unless stated otherwise, terms such as, for example, "a", "one", "first", are considered open-ended, and do not mean "only a", "only one" and "only a first", respectively. Moreover, unless stated otherwise, the term "first" does not, by itself, require that there also be a "second".

In addition, unless stated otherwise, terms such as, for example, "in response to" and "based on" mean "in response at least to" and "based at least on", respectively, so as not to preclude being responsive to and/or based on, more than one thing.

In addition, unless stated otherwise, a "user device" may comprise any type of device that may be used by a user. Thus, a user device may have any form factor and may not be owned by and/or assigned to a user.

In addition, unless stated otherwise, a "database" may comprise one or more related or unrelated databases.

In addition, unless stated otherwise, data may comprise any type of information and may have and/or be stored in any form. In some embodiments, data may be stored in raw, excerpted, summarized and/or analyzed form.

Unless stated otherwise, a processing system may comprise any type of processing system. For example, a processing system may be programmable or non programmable, general purpose or special purpose, dedicated or non dedicated, distributed or non distributed, shared or not shared, and/or any combination thereof. A processing system may include, but is not limited to, hardware, software, firmware, and/or any combination thereof. Hardware may include, but is not limited to off the shelf integrated circuits, custom integrated circuits and/or any combination thereof. In some embodiments, a processing system will include at least one processor. Software may include, but is not limited to, instructions that are storable and/or stored on a computer readable medium, such as, for example, magnetic or optical disk, magnetic or optical tape, CD-ROM, DVD, RAM, EPROM, ROM or other semiconductor memory. In some embodiments, a processing system will include at least one processor that executes instructions stored on the computer readable medium. A processing system may employ continuous signals, periodically sampled signals, and/or any combination thereof. If a processor is distributed, two or more portions of the processor may communicate with one another through a communication link.

Unless stated otherwise, a processor may comprise any type of processor. For example, a processor may be programmable or non programmable, general purpose or special purpose, dedicated or non dedicated, distributed or non distributed, shared or not shared, and/or any combination thereof. A processor may include, but is not limited to, hardware, software, firmware, and/or any combination thereof. Hardware may include, but is not limited to off the shelf integrated circuits, custom integrated circuits and/or any combination thereof. In some embodiments, a processor comprises a microprocessor. Software may include, but is not limited to, instructions that are storable and/or stored on a computer readable medium, such as, for example, magnetic or optical disk, magnetic or optical tape, CD-ROM, DVD, RAM, EPROM, ROM or other semiconductor memory. In some embodiments, a processing may execute instructions stored on the computer readable medium. A processor may employ continuous signals, periodically sampled signals, and/or any combination thereof. If a processor is distributed, two or more portions of the processor may communicate with one another through a communication link.

In addition, unless stated otherwise, a communication link may be any type of communication link, for example, but not limited to, wired (e.g., conductors, fiber optic cables) or wireless (e.g., acoustic links, electromagnetic links or any combination thereof including, for example, but not limited to microwave links, satellite links, infrared links), and/or combinations thereof, each of which may be public or private, dedicated and/or shared (e.g., a network). A communication link may or may not be a permanent communication link. A communication link may support any type of information in any form, for example, but not limited to, analog and/or digital (e.g., a sequence of binary values, i.e. a bit string) signal(s) in serial and/or in parallel form. The information may or may not be divided into blocks. If divided into blocks, the amount of information in a block may be predetermined or determined dynamically, and/or may be fixed (e.g., uniform) or variable. A communication link may employ a protocol or combination of protocols.

While various embodiments have been described, such description should not be interpreted in a limiting sense. It is to be understood that other embodiments may be practiced without departing from the spirit and scope of the invention, as recited in the claims appended hereto.

What is claimed is:

1. A method comprising:
receiving, by a first processing system, information indicating that a second processing system has content that is to be provided to the first processing system;
receiving, by the first processing system, content and at least one identifier from the second processing system;
determining, by the first processing system and based at least in part on the at least one identifier, whether the content received from the second processing system is another version of content previously received by the first processing system;
receiving, by the first processing system, information indicating that a third processing system is to receive content from the first processing system; and
transmitting, by the first processing system, the content to be received from the first processing system, at least one identifier and version information to the third processing system, wherein the version information indicates whether the transmitted content is another version of content that has been previously transmitted by the first processing system to the third processing system;
wherein the determining, by the first processing system and based at least in part on the at least one identifier, whether the content received from the second processing system is another version of content previously received by the first processing system comprises:
determining that the content received from the second processing system is another version of content previously received by the first processing system;
wherein the content received from the second processing system comprises a content group having a plurality of content records; and
wherein the content previously received by the first processing system comprises a content group having a plurality of content records;
the method further comprising:
comparing, by the first processing system, the content received from the second processing system to the content previously received by the first processing system to determine whether one of the plurality of content records in the content group of the content previously received by the first processing system is deleted from the plurality of records in the content group of the content received from the second processing system;
providing, by a processing system, a graphical user interface that indicates whether the first processing system determined that one of the plurality of content records in the content group of the content previously received by the first processing system is deleted from the plurality of records in the content group of the content received from the second processing system;

comparing, by the first processing system, the content received from the second processing system to the content previously received by the first processing system to determine whether one of the plurality of content records in the first content group of the content received from the second processing system is a same version as one of the plurality of content records in the second content group of the content previously received or a different version from the one of the plurality of content records in the second content group of the content previously received; and comparing, by the first processing system, the content received from the second processing system to the content previously received by the first processing system to determine whether one of the plurality of content records in the first content group of the content received from the second processing system is not another version of any of the plurality of content records in the second content group of the content previously received.

2. The method of claim 1 wherein the at least one identifier received from the second processing system comprises a plurality of identifiers, each one of the plurality of identifiers being associated with and identifying a respective one of the plurality of content records in the content group of the content received from the second processing system.

3. The method of claim 1 further comprising:
determining at least one global identifier based at least in part on the at least one identifier from the second processing system and a one-to-one mapping from the at least one identifier from the second processing system to the at least one global identifier.

4. The method of claim 3 further comprising:
determining the at least one identifier transmitted to the third processing system based at least in part on the at least one global identifier and a one-to-one mapping between the at least one global identifier and the at least one identifier transmitted to the third processing system.

5. The method of claim 1 wherein the receiving content and at least one identifier from the second processing system comprises:
extracting, from the second processing system, the content and the at least one identifier to be provided to the first processing system.

6. The method of claim 1 wherein the transmitting content to the third processing system comprises:
deploying, to the third processing system, the content to be received from the first processing system.

7. The method of claim 1 wherein the information indicating that a second processing system is to provide content to the first processing system is supplied by a graphical user interface in response to input from a user; and
wherein the information indicating that the third processing system is to receive content from the first processing system is supplied by a graphical user interface in response to input from a user.

8. The method of claim 3 wherein the at least one global identifier comprises a global identifier, and wherein the determining whether the content received from the second processing system is another version of content previously received by the first processing system comprises:
determining, based at least in part on the global identifier that a version of the content received from the second processing system has been previously received by the first processing system; and
determining, based at least in part on the content received from the second processing system, that the content received from the second processing system is a same version or a different version of content previously received by the first processing system.

9. The method of claim 8, the method further comprising:
identifying, by the first processing system, one or more of the follow changes to the content received from the second processing system compared to the content previously received by the first processing system:
one of the plurality of content records in the content group of the content received from the second processing system is a same version as one of the plurality of content records in the content group of the content previously received by the first processing system;
one of the plurality of content records in the content group of the content received from the second processing system is a different version from one of the plurality of content records in the content group of the content previously received by the first processing system; or
one of the plurality of content records in the content group of the content received from the second processing system is not another version of any of the plurality of content records in the content group of the content previously received by the first processing system.

10. The method of claim 9 further comprising:
providing a user interface to allow a user to reject one or more of the identified changes.

11. The method of claim 10 further comprising:
transmitting content from the first processing system to the third processing system based at least in part on the users choices.

12. The method of claim 1 further comprising:
determining whether the at least one identifier received from the second processing system includes a global identifier having an originating vendor identifier, an authoring source identifier and an application namespace field.

13. The method of claim 3 wherein the at least one global identifier includes an identifier having an originating vendor identifier, an authoring source identifier and an application namespace field.

14. A non-transitory computer readable storage medium having instructions stored thereon, the instructions being executable by a machine to result in a method comprising:
receiving, by a first processing system, information indicating that a second processing system has content that is to be provided to the first processing system;
receiving, by the first processing system, content and at least one identifier from the second processing system;
determining, by the first processing system and based at least in part on the at least one identifier, whether the content received from the second processing system is another version of content previously received by the first processing system;
receiving, by the first processing system, information indicating that a third processing system is to receive content from the first processing system; and
transmitting, by the first processing system, the content to be received from the first processing system, at least one identifier and version information to the third processing system, wherein the version information indicates whether the transmitted content is another version of content that has been previously transmitted by the first processing system to the third processing system;

wherein the determining, by the first processing system and based at least in part on the at least one identifier, whether the content received from the second processing system is another version of content previously received by the first processing system comprises:
    determining that the content received from the second processing system is another version of content previously received by the first processing system;
wherein the content received from the second processing system comprises a content group having a plurality of content records; and
wherein the content previously received by the first processing system comprises a content group having a plurality of content records;
the method further comprising:
    comparing, by the first processing system, the content received from the second processing system to the content previously received by the first processing system to determine whether one of the plurality of content records in the content group of the content previously received by the first processing system is deleted from the plurality of records in the content group of the content received from the second processing system;
    providing, by a processing system, a graphical user interface that indicates whether the first processing system determined that one of the plurality of content records in the content group of the content previously received by the first processing system is deleted from the plurality of records in the content group of the content received from the second processing system;
    comparing, by the first processing system, the content received from the second processing system to the content previously received by the first processing system to determine whether one of the plurality of content records in the first content group of the content received from the second processing system is a same version as one of the plurality of content records in the second content group of the content previously received or a different version from the one of the plurality of content records in the second content group of the content previously received; and
    comparing, by the first processing system, the content received from the second processing system to the content previously received by the first processing system to determine whether one of the plurality of content records in the first content group of the content received from the second processing system is not another version of any of the plurality of content records in the second content group of the content previously received.

15. The medium of claim 14 wherein the at least one identifier received from the second processing system comprises a plurality of identifiers, each one of the plurality of identifiers being associated with and identifying a respective one of the plurality of content records in the content group of the content received from the second processing system.

16. The medium of claim 14, the method further comprising:
    determining at least one global identifier based at least in part on the at least one identifier from the second processing system and a one-to-one mapping from the at least one identifier from the second processing system to the at least one global identifier.

17. The medium of claim 16, the method further comprising:
    determining the at least one identifier transmitted to the third processing system based at least in part on the at least one global identifier and a one-to-one mapping between the at least one global identifier and the at least one identifier transmitted to the third processing system.

18. The medium of claim 14, wherein the receiving content and at least one identifier from the second processing system comprises:
    extracting, from the second processing system, the content and the at least one identifier to be provided to the first processing system.

19. The medium of claim 14 wherein the transmitting content to the third processing system comprises:
    deploying, to the third processing system, the content to be received from the first processing system.

20. Apparatus comprising:
    a first processing system comprising a processor, the processing system to (i) receive information indicating that a second processing system has content that is to be provided to the first processing system; receive content and at least one identifier from the second processing system; determine, based at least in part on the at least one identifier, whether the content received from the second processing system is another version of content previously received by the first processing system; receive information indicating that a third processing system is to receive content from the first processing system; and transmit the content to be received from the first processing system, at least one identifier and version information to the third processing system, wherein the version information indicates whether the transmitted content is another version of content that has been previously transmitted by the first processing system to the third processing system;
    wherein the determine, based at least in part on the at least one identifier, whether the content received from the second processing system is another version of content previously received by the first processing system comprises:
        determine that the content received from the second processing system is another version of content previously received by the first processing system;
    wherein the content received from the second processing system comprises a content group having a plurality of content records; and
    wherein the content previously received by the first processing system comprises a content group having a plurality of content records;
    the first processing system further to: compare the content received from the second processing system to the content previously received by the first processing system to determine whether one of the plurality of content records in the content group of the content previously received by the first processing system is deleted from the plurality of records in the content group of the content received from the second processing system, compare the content received from the second processing system to the content previously received by the first processing system to determine whether one of the plurality of content records in the first content group of the content received from the second processing system is a same version as one of the plurality of content records in the second content group of the content previously received or a different version from the one of the plurality of content records in the second content group of the content previously received, and compare the content received from the second processing system to the content previously received by the first processing system to determine whether one of the plurality of content records in the first content group of the content received from the second processing system is not another version of any of the plurality of content records in the second content group of the content previously received;

the apparatus further comprising:
    a processing system to provide a graphical user interface that indicates whether the first processing system determined that one of the plurality of content records in the content group of the content previously received by the first processing system is deleted from the plurality of records in the content group of the content received from the second processing system.

21. The apparatus of claim 20, wherein the at least one identifier received from the second processing system comprises a plurality of identifiers, each one of the plurality of identifiers being associated with and identifying a respective one of the plurality of content records in the content group of the content received from the second processing system.

22. The apparatus of claim 20, the first processing system further to determine at least one global identifier based at least in part on the at least one identifier from the second processing system and a one-to-one mapping from the at least one identifier from the second processing system to the at least one global identifier.

23. The apparatus of claim 22, the first processing system further to determine the at least one identifier transmitted to the third processing system based at least in part on the at least one global identifier and a one-to-one mapping between the at least one global identifier and the at least one identifier transmitted to the third processing system.

24. The apparatus of claim 20, wherein the receive content from the second processing system comprises:
    extract, from the second processing system, the content and the at least one identifier to be provided to the first processing system.

25. The apparatus of claim 20, wherein the transmit content to the third processing system comprises:
    deploy, to the third processing system, the content to be received from the first processing system.

26. The method of claim 1 further comprising:
    transmitting, by the first processing system, the transmitted content to a fourth processing system.

27. The method of claim 1 wherein the version information is: (i) separate from the content to be received from the first processing system and (ii) indicates whether the transmitted content is another version of content that has been previously transmitted by the first processing system to the third processing system.

28. The method of claim 1 wherein the determining whether a global identifier has already been generated for the local identifier comprises:
    determining whether the local identifier is included in a table that represents a mapping between local identifiers and global identifiers.

29. The method of claim 1 further comprising:
    determining a cryptographic hash for the content record;
    determining a cryptographic hash for content previously received; and
    comparing the cryptographic hash for the content record to the cryptographic hash for content previously received.

30. The method of claim 1 wherein the comparing, by the first processing system, the content received from the second processing system to the content previously received by the first processing system to determine whether one of the plurality of content records in the content group of the content previously received by the first processing system is deleted from the plurality of records in the content group of the content received from the second processing system comprises:
    determining, by the first processing system, that one of the plurality of content records in the content group of the content previously received by the first processing system is deleted from the plurality of records in the content group of the content received from the second processing system;
    wherein the providing, by a processing system, a graphical user interface that indicates whether the first processing system determined that one of the plurality of content records in the content group of the content previously received by the first processing system is deleted from the plurality of records in the content group of the content received from the second processing system comprises:
    providing, by a processing system, a graphical user interface that indicates that the first processing system determined that one of the plurality of content records in the content group of the content previously received by the first processing system is deleted from the plurality of records in the content group of the content received from the second processing system; and
    wherein the graphical user interface gives a user an option to reject the deletion.

31. The method of claim 1 wherein the providing, by a processing system, a graphical user interface that indicates whether the first processing system determined that one of the plurality of content records in the content group of the content previously received by the first processing system is deleted from the plurality of records in the content group of the content received from the second processing system comprises:
    providing, by the first processing system, a graphical user interface that indicates whether the first processing system determined that one of the plurality of content records in the content group of the content previously received by the first processing system is deleted from the plurality of records in the content group of the content received from the second processing system.

\* \* \* \* \*